US011531845B1

(12) United States Patent
Hunt et al.

(10) Patent No.: US 11,531,845 B1
(45) Date of Patent: Dec. 20, 2022

(54) BIAS MITIGATING MACHINE LEARNING TRAINING SYSTEM

(71) Applicant: SAS Institute Inc., Cary, NC (US)

(72) Inventors: Xin Jiang Hunt, Cary, NC (US); Xinmin Wu, Cary, NC (US); Ralph Walter Abbey, Cary, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 17/837,444

(22) Filed: Jun. 10, 2022

Related U.S. Application Data

(63) Continuation-in-part of application No. 17/557,298, filed on Dec. 21, 2021.

(60) Provisional application No. 63/272,980, filed on Oct. 28, 2021, provisional application No. 63/252,918, filed on Oct. 6, 2021.

(51) Int. Cl.
*G06N 20/00* (2019.01)
*G06K 9/62* (2022.01)

(52) U.S. Cl.
CPC ........... *G06K 9/6257* (2013.01); *G06N 20/00* (2019.01)

(58) Field of Classification Search
CPC ........................... G06K 9/6265; G06N 20/00
See application file for complete search history.

(56) References Cited

PUBLICATIONS

Hardt, Moritz, Eric Price, and Nati Srebro. "Equality of opportunity in supervised learning." *Advances in neural information processing systems* 29 (2016).

*Primary Examiner* — Casey R. Garner
(74) *Attorney, Agent, or Firm* — Bell & Manning, LLC

(57) ABSTRACT

A computing device trains a fair machine learning model. A prediction model is trained to predict a target value. For a number of iterations, a weight vector is computed using the bound value based on fairness constraints defined for a fairness measure type; a weight value is assigned to each observation vector based on the target value and a sensitive attribute value; the prediction model is trained with each weighted observation vector to predict the target value; and a conditional moments vector is computed based on the fairness constraints and the target and sensitive attribute values. Conditional moments difference values are computed. When the conditional moments difference values indicate to adjust the bound value, the bound value is updated and the process is repeated with the bound value replaced with the updated bound value until the conditional moments difference values indicate no further adjustment of the bound value is needed.

30 Claims, 19 Drawing Sheets

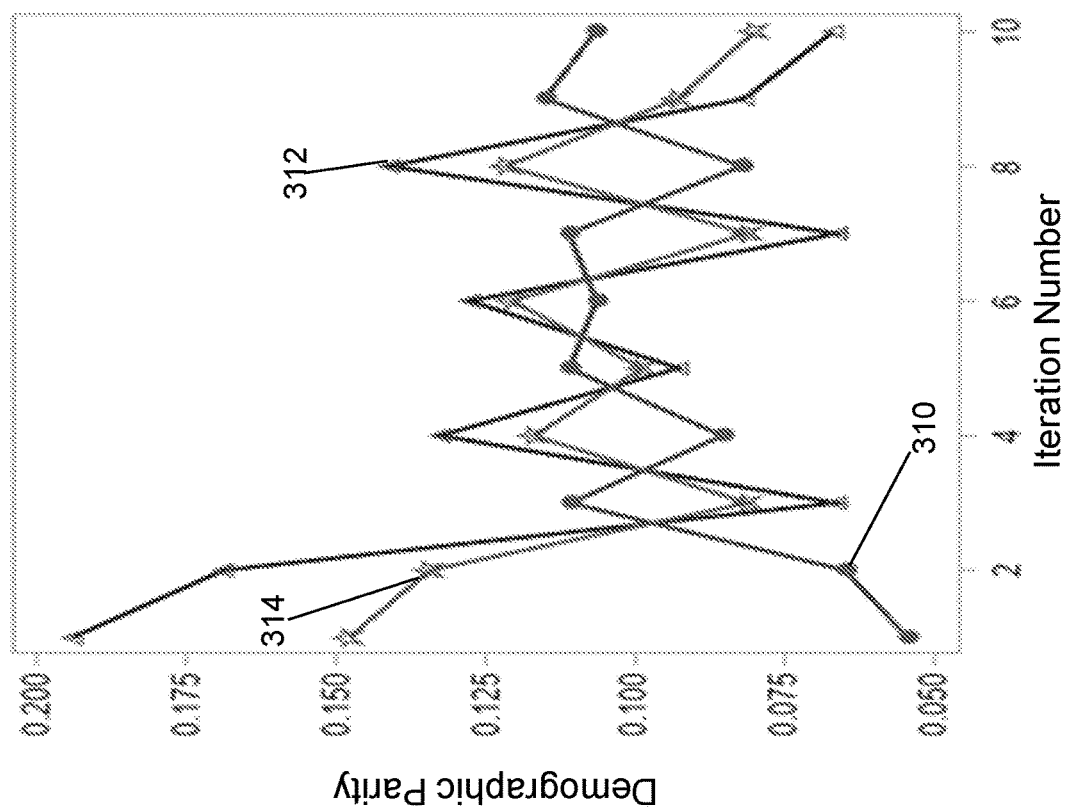
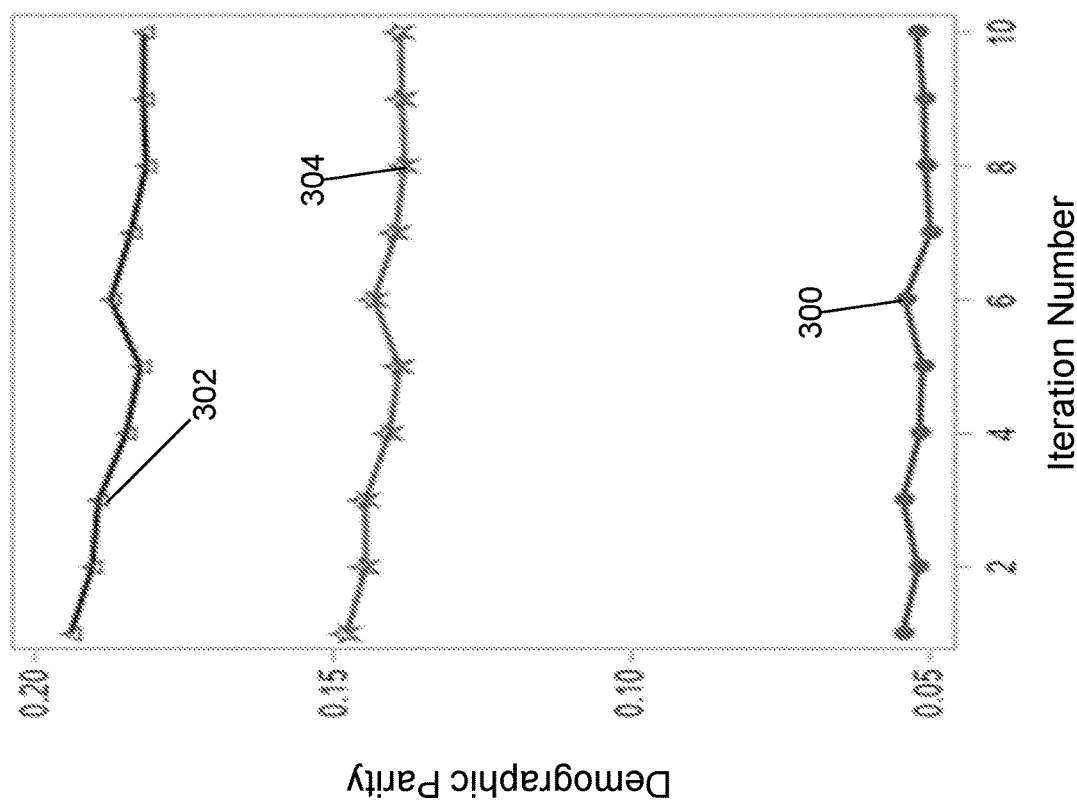
FIG. 3A
FIG. 3B

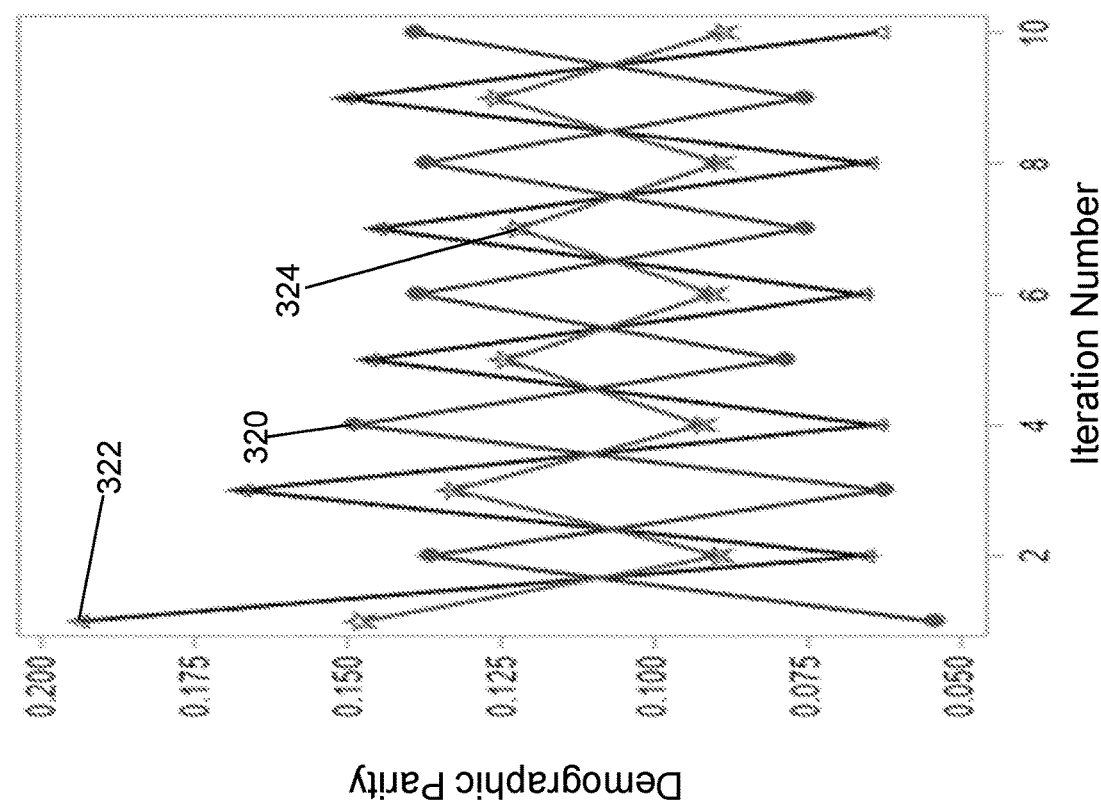

BIAS MITIGATING MACHINE LEARNING TRAINING SYSTEM

CROSS-REFERENCE TO RELATED APPLICATIONS

The present application claims the benefit of and priority under 35 U.S.C. § 119(e) to U.S. Provisional Patent Application No. 63/272,980 filed on Oct. 28, 2021 and to U.S. Provisional Patent Application No. 63/252,918 filed on Oct. 6, 2021, the entire contents of which are hereby incorporated by reference.

The present application is also a continuation-in-part of U.S. patent application Ser. No. 17/557,298 that was filed Dec. 21, 2021, the entire contents of which are hereby incorporated by reference. U.S. patent application Ser. No. 17/557,298 claims the benefit of and priority under 35 U.S.C. § 119(e) to U.S. Provisional Patent Application No. 63/272,980 filed on Oct. 28, 2021 and to U.S. Provisional Patent Application No. 63/252,918 filed on Oct. 6, 2021.

BACKGROUND

Machine learning models may be used to make decisions based on predictions across various domains such as financial services, healthcare, education, human resources, etc. The development and use of machine learning models provide increased productivity and cost savings and are supported by the ability to collect, aggregate, and process large amounts of data, for example, using cloud computing and the Internet of things (IoT). Machine learning models are trained using the collected and aggregated data to make predictions. The data may include observations related to one or more entities possibly as a function of time. In some cases, the data may be pre-processed in various manners, for example, to remove incomplete observations. Each entity may be a person or a business. In some application areas, it is important to understand why a machine learning model made a prediction for an observation and whether the prediction was impacted by any bias.

Recently, issues associated with machine learning models that exhibit bias have been identified. Across many industries and applications, it has been shown that machine learning can unfairly disadvantage some groups or individuals. In particular, concerns about the potentially discriminatory impact associated with the use of machine learning models in automated decision-making have been raised due to inadvertent encoding of unwanted bias into the automated decision-making process. An example relates to the correctional offender management profiling for alternative sanctions (COMPAS) program that is based on machine learning. COMPAS measures the risk associated with a person committing another crime. Some judges used COMPAS to inform a decision about whether to release an offender or to keep the offender in prison. An investigation into the software found a bias against African Americans. Another example relates to the use of facial recognition that is based on machine learning models. The facial recognition models have proven to be inaccurate in identifying various ethnic groups. As yet another example, lending applications that incorporate the use of machine learning models have been shown to exhibit bias towards certain groups whether based on ethnicity, age, or gender. As still another example, medical applications that incorporate the use of machine learning models also have been shown to exhibit bias towards certain groups whether based on ethnicity, age, or gender. For example, the same medical treatment may not be recommended for all groups. To have confidence in automated decision-making processes, it is important that machine learning models not impose unfair or unwanted bias toward certain groups or sub-populations whether based on ethnicity, age, gender, citizenship, geographical location, etc.

With the widespread use of artificial intelligence systems based on machine learning models, especially in areas involving important and potentially life changing decisions, the fairness of the decision-making process must be evaluated to ensure that the process identifies any unfair bias and then eliminates, minimizes, and/or mitigates that bias. Developing responsible machine learning solutions is a process involving different tools applied across all phases of the machine learning lifecycle. Data scientists and machine learning engineers need the tools to generate the insights required to debug and improve machine learning models to determine whether a model is making inferences based on noisy or irrelevant features and to understand the limitations of the models.

The training of fair machine learning models is a key phase of the machine learning lifecycle. The data used to train machine learning models may reflect historical or other unwarranted disparities or other inherent biases. For example, the training data may have insufficient representation or overrepresentation of various groups or may contain biased labels. The machine learning models trained using the data may reflect the biases and reproduce those biases in the resulting predictions.

Fairness is a measure of whether a machine learning model exhibits bias based on an evaluation of a sensitive attribute, for example, that indicates an ethnicity, an age, a gender, a citizenship, a geographical location, etc. Fairness can be summarized as the absence of prejudice or preference for an individual or group based on their characteristics given the value of the sensitive attribute. Various fairness measures, including demographic parity, equal opportunity, equalized odds, etc., have been defined. To address fairness in machine learning, predictions made by machine learning models should be calibrated for each group to avoid systemically overestimating or underestimating a probability of an outcome for a specific group based on a selected fairness measure.

Previous work in this area can be divided into two broad groups of approaches. The first group of approaches incorporate specific quantitative definitions of fairness into existing machine learning methods, often by relaxing the desired definition of fairness, and only enforcing weaker constraints, such as a lack of correlation. The guarantee of fairness typically only holds given strong distributional assumptions, and the approaches are tied to specific families of classifiers such as support vector machines.

The second group of approaches eliminate the restriction to specific classifier families and treat the underlying prediction method as a "black box". The prediction model may be used to predict a class or label for an observation. A wrapper around the prediction model may be used that works by either pre-processing the data or post-processing the prediction model's predictions. In practice, the second group of approaches result in prediction models that may still exhibit substantial unfairness. Existing pre-processing approaches apply to specific fairness measures and typically create a single transformed dataset that can be used to train any machine learning model. In contrast, post-processing the predictions provides a wider range of fairness definitions and results in provably increased fairness. However, the post-processing of the predictions is not guaranteed to identify the most accurate fair prediction model, and requires test-time access to the sensitive attribute, which may not be available.

A paper titled *A Reductions Approach to Fair Classification* by Alekh Agarwal et al. published in the Proceedings of the 35th International Conference on Machine Learning in 2018 (the EGR method) describes a third approach that has the key advantage of the second group of approaches without the noted disadvantages. Again, a wrapper is used around the prediction model that is treated as a black box such that the fairness constraints are applied during the model training process. Test-time access to the sensitive attribute is not needed. A wide range of fairness measures may be used that are guaranteed to yield the most accurate fair prediction model subject to selection of values for a bound hyperparameter and a learning rate hyperparameter. The EGR method reduces the fair prediction problem to a sequence of cost-sensitive prediction problems, whose solutions yield a randomized prediction model with the lowest (empirical) error subject to the selected fairness measure. However, the performance of the EGR method is sensitive to the values selected for the bound hyperparameter and the learning rate hyperparameter. The bound value is an important hyperparameter for a sample re-weighting and relabeling process that controls how heavily the fairness constraint violations are penalized, and therefore determines the tradeoff between the fairness constraints and the model accuracy. When the bound value is too small, the EGR method does not enforce the fairness constraints enough, and bias is not reduced very much, which means there is not enough momentum to drive the prediction model to the saddle points. When the bound value is too large, the EGR method easily goes beyond saddle points and causes the EGR method to diverge. The learning rate controls how quickly the EGR method reduces fairness constraint violations. If the learning rate is too small, the EGR method converges very slowly resulting in a long training process execution time. If the learning rate is too large, the EGR method becomes unstable and may not converge.

SUMMARY

In an example embodiment, a non-transitory computer-readable medium is provided having stored thereon computer-readable instructions that, when executed by a computing device, cause the computing device to train a fair machine learning model. (A) A prediction model is trained with a plurality of observation vectors. Each observation vector of the plurality of observation vectors includes a target variable value, a sensitive attribute variable value, and a plurality of attribute variable values. (B) A second target variable value is predicted for each observation vector of the plurality of observation vectors using the trained prediction model. (C) A bound value is initialized using a predefined bound value. (D) A number of iterations is initialized. (E) A weight vector is computed that includes a plurality of weight values using the bound value. Each weight value is computed based on fairness constraints defined for a predefined fairness measure type. (F) A weight value from the computed weight vector is assigned to each observation vector of the plurality of observation vectors based on the predicted second target variable value and the sensitive attribute variable value of each respective observation vector of the plurality of observation vectors. (G) The prediction model is trained with each observation vector of the plurality of observation vectors weighted by the respective assigned weight value. (H) The second target variable value is predicted for each observation vector of the plurality of observation vectors using the prediction model trained in (G). (I) A conditional moments vector is computed based on the fairness constraints and the predicted second target variable value and the sensitive attribute variable value of each respective observation vector of the plurality of observation vectors. (J) The initialized number of iterations is incremented. (K) (E) through (H) are repeated until a predefined number of bound test update iterations is performed based on the incremented number of iterations. (L) Conditional moments difference values are computed based on the fairness constraints. (M) When the computed conditional moments difference values indicate to adjust the bound value, the bound value is updated and (D) through (M) are repeated with the bound value replaced with the updated bound value until the computed conditional moments difference values indicate that no further adjustment of the bound value is needed. (N) The updated bound value is stored as a first bound value and (A) through (M) are repeated. (O) After (N), the updated bound value is computed from the stored first bound value and the updated bound value determined from the repeat of (A) through (M). (P) A fair prediction model is trained with the updated bound value computed in (O). (Q) The fair prediction model trained in (P) is output.

In yet another example embodiment, a computing device is provided. The computing device includes, but is not limited to, a processor and a non-transitory computer-readable medium operably coupled to the processor. The computer-readable medium has instructions stored thereon that, when executed by the computing device, cause the computing device to train a fair machine learning model.

In an example embodiment, a method of training a fair machine learning model is provided.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

FIG. 3A shows a demographic parity fairness measure for different groups with a bound value that is too small in accordance with an illustrative embodiment.

FIG. 3B shows a demographic parity fairness measure for different groups with a bound value that is too large in accordance with an illustrative embodiment.

FIG. 3C shows a demographic parity fairness measure for different groups with a learning rate value that is too large given the bound value in accordance with an illustrative embodiment.

DETAILED DESCRIPTION

Figure 1:
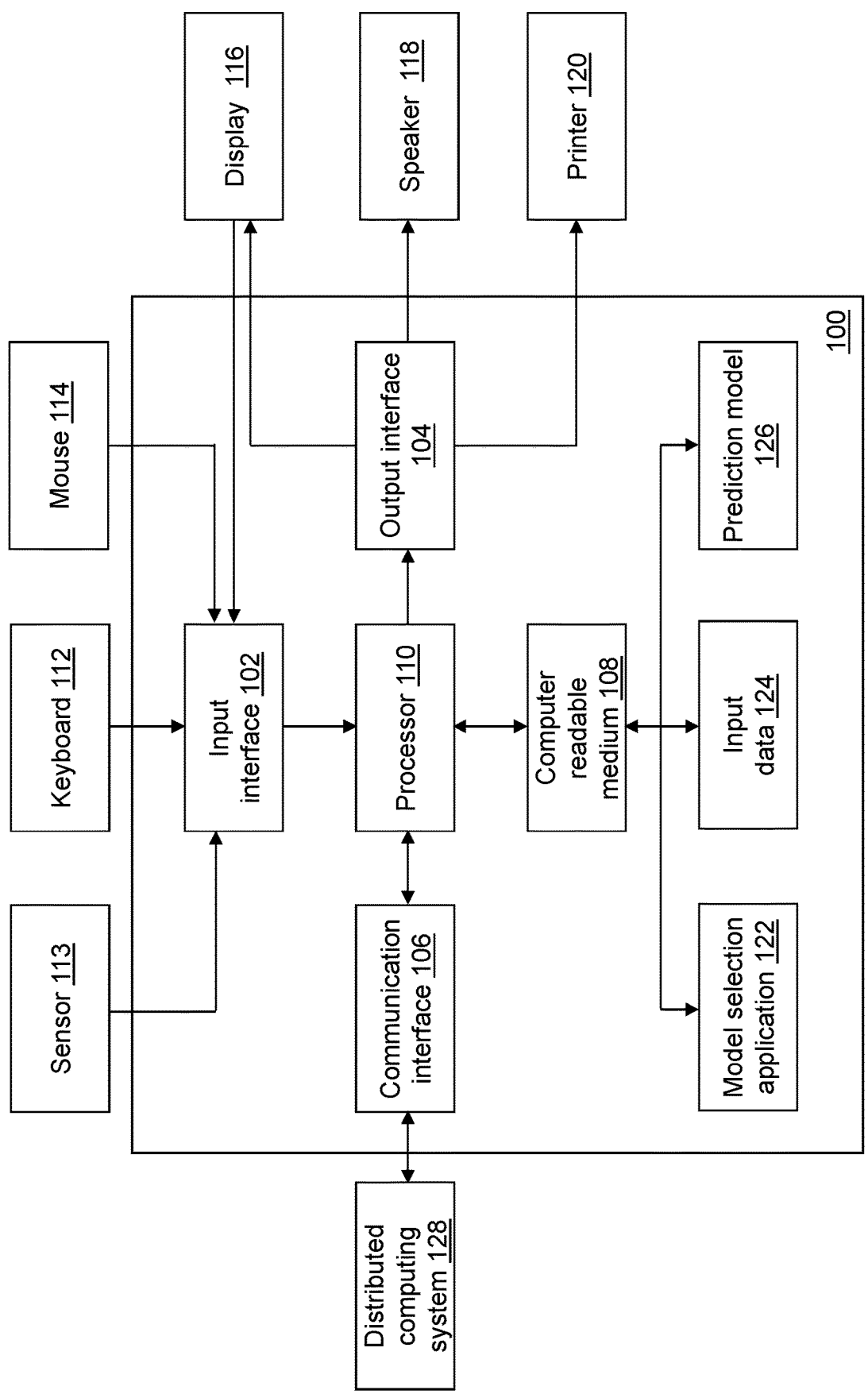
FIG. 1 depicts a block diagram of a model selection device in accordance with an illustrative embodiment.

A model selection application 122 provides an automated model selection process to identify a best prediction model based on values for the bound hyperparameter and the learning rate hyperparameter. As stated previously, the performance of the EGR method is sensitive to the values selected for the bound hyperparameter and the learning rate hyperparameter. For illustration, referring to FIG. 3A, a demographic parity (DP) fairness measure is shown for different groups using the Adult dataset. The Adult dataset has 48,842 observation vectors with income related attributes, and the task is to predict whether someone makes more than 50,000 per year with gender as the sensitive attribute. By definition, demographic parity requires that a positive decision be statistically independent of the sensitive attribute. The mathematical equation for DP is Probability(Y=1|A=0)=Probability(Y=1|A=1), where Y is the predicted binary target variable, and A is a binary sensitive attribute with possible values of 0 and 1. For example, A=0 may indicate a male individual, and A=1 may indicate a female individual. As another example, A=0 may indicate an individual at or over 50 years old, and A=1 may indicate an individual less than 50 years old. As another example, A=0 may indicate a white individual, and A=1 may indicate a non-white individual. DP is reflected in the U.S. Equal Employment Opportunity Commission's "four-fifth rule". For example, for a job application, DP can require applicants of each race (or gender, etc.) have the same odds of passing a job screening process.

Demographic parity refers to the average predicted value of a group. Thus, an unbiased model should have similar DP values for all groups. The phrase "DP gap" refers to a largest absolute difference between groups for the average predicted value. One way to mitigate bias is to make the DP gap value as small as possible. Using the Adult dataset where the input and the starting model are the same, only the values for the bound hyperparameter and the learning rate hyperparameter in the EGR method are applied differently. Referring to FIG. 3A, a first DP curve 300 is shown for a group having A=0; a second DP curve 302 is shown for a group having A=1; and a third DP curve 304 is shown overall for both groups. When the bound value is too small, the DP gap between the group having A=0 and the group having A=1 does not change very much as the EGR method iterates towards a trained model meaning the trained model is not closing the DP gap.

Referring to FIG. 3B, a fourth DP curve 310 is shown for a group having A=0; a fifth DP curve 312 is shown for a group having A=1; and a sixth DP curve 314 is shown overall for both groups. When the bound value is too large, the DP gap between the group having A=0 and the group having A=1 moves back and forth from positive to negative as the EGR method iterates towards a trained model meaning the disparity overreacts each step relative to the previous step and the trained model is again not closing the DP gap.

Referring to FIG. 3C, a seventh DP curve 320 is shown for a group having A=0; an eighth DP curve 322 is shown for a group having A=1; and a ninth DP curve 324 is shown overall for both groups. Although the bound value is in a good range for a different learning rate, the learning rate value is set too large. When the learning rate value is too large for the bound value, the DP gap between the group having A=0 and the group having A=1 again moves back and forth from positive to negative as the EGR method iterates towards a trained model meaning the disparity again overreacts each step relative to the previous step.

Selecting the appropriate values for both hyperparameters is key to achieving fairness goals. The optimal bound value depends on a number of observation vectors included in the input dataset, a number of constraints defined by the selected fairness measure, the type of constraints, the learning rate, etc. After an extensive study of the hyperparameter values using various datasets, it was found that the optimal bound value and learning rate value depend on each other such that changing one alters the optimal range of the other. Due to this interdependency, model selection application 122 adjusts just the bound value to achieve a balance of the bound value and the learning rate value for good model performance. Model selection application 122 can be applied in a distributed computing environment, for example, to support big data applications.

Referring to FIG. 1, a block diagram of a model selection device 100 is shown in accordance with an illustrative embodiment. Model selection device 100 may include an input interface 102, an output interface 104, a communication interface 106, a non-transitory computer-readable medium 108, a processor 110, model selection application 122, input data 124, and a prediction model 126. Model selection application 122 repeatedly trains a prediction model using input data 124 while evaluating whether the bound value is too small or too large. When the bound value is too small or too large, the bound value is adjusted for a next set of iterations. Fewer, different, and/or additional components may be incorporated into model selection device 100.

Input interface 102 provides an interface for receiving information from the user or another device for entry into model selection device 100 as understood by those skilled in the art. Input interface 102 may interface with various input technologies including, but not limited to, a keyboard 112, a sensor 113, a mouse 114, a display 116, a track ball, a keypad, one or more buttons, etc. to allow the user to enter information into model selection device 100 or to make selections presented in a user interface displayed on display 116.

The same interface may support both input interface 102 and output interface 104. For example, display 116 comprising a touch screen provides a mechanism for user input and for presentation of output to the user. Model selection device 100 may have one or more input interfaces that use the same or a different input interface technology. The input interface technology further may be accessible by model selection device 100 through communication interface 106.

Output interface 104 provides an interface for outputting information for review by a user of model selection device 100 and/or for use by another application or device. For example, output interface 104 may interface with various output technologies including, but not limited to, display 116, a speaker 118, a printer 120, etc. Model selection device 100 may have one or more output interfaces that use the same or a different output interface technology. The output interface technology further may be accessible by model selection device 100 through communication interface 106.

Communication interface 106 provides an interface for receiving and transmitting data between devices using various protocols, transmission technologies, and media as understood by those skilled in the art. Communication interface 106 may support communication using various transmission media that may be wired and/or wireless. Model selection device 100 may have one or more communication interfaces that use the same or a different communication interface technology. For example, model selection device 100 may support communication using an Ethernet port, a Bluetooth® antenna, a telephone jack, a USB port, etc. Data and/or messages may be transferred between model selection device 100 and another computing device of a distributed computing system 128 using communication interface 106.

Computer-readable medium 108 is an electronic holding place or storage for information so the information can be accessed by processor 110 as understood by those skilled in the art. Computer-readable medium 108 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. Model selection device 100 may have one or more computer-readable media that use the same or a different memory media technology. For example, computer-readable medium 108 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. Model selection device 100 also may have one or more drives that support the loading of a memory media such as a CD, DVD, an external hard drive, etc. One or more external hard drives further may be connected to model selection device 100 using communication interface 106.

Processor 110 executes instructions as understood by those skilled in the art. The instructions may be carried out by a special purpose computer, logic circuits, or hardware circuits. Processor 110 may be implemented in hardware and/or firmware. Processor 110 executes an instruction, meaning it performs/controls the operations called for by that instruction. The term "execution" is the process of running an application or the carrying out of the operation called for by an instruction. The instructions may be written using one or more programming language, scripting language, assembly language, etc. Processor 110 operably couples with input interface 102, with output interface 104, with communication interface 106, and with computer-readable medium 108 to receive, to send, and to process information. Processor 110 may retrieve a set of instructions from a permanent memory device and copy the instructions in an executable form to a temporary memory device that is generally some form of RAM. Model selection device 100 may include a plurality of processors that use the same or a different processing technology.

Some machine-learning approaches may be more efficiently and speedily executed and processed with machine-learning specific processors (e.g., not a generic central processing unit (CPU)). Such processors may also provide additional energy savings when compared to generic CPUs. For example, some of these processors can include a graphical processing unit, an application-specific integrated circuit, a field-programmable gate array, an artificial intelligence accelerator, a purpose-built chip architecture for machine learning, and/or some other machine-learning specific processor that implements a machine learning approach using semiconductor (e.g., silicon, gallium arsenide) devices. These processors may also be employed in heterogeneous computing architectures with a number of and a variety of different types of cores, engines, nodes, and/or layers to achieve additional various energy efficiencies, processing speed improvements, data communication speed improvements, and/or data efficiency targets and improvements throughout various parts of the system.

Figure 4:
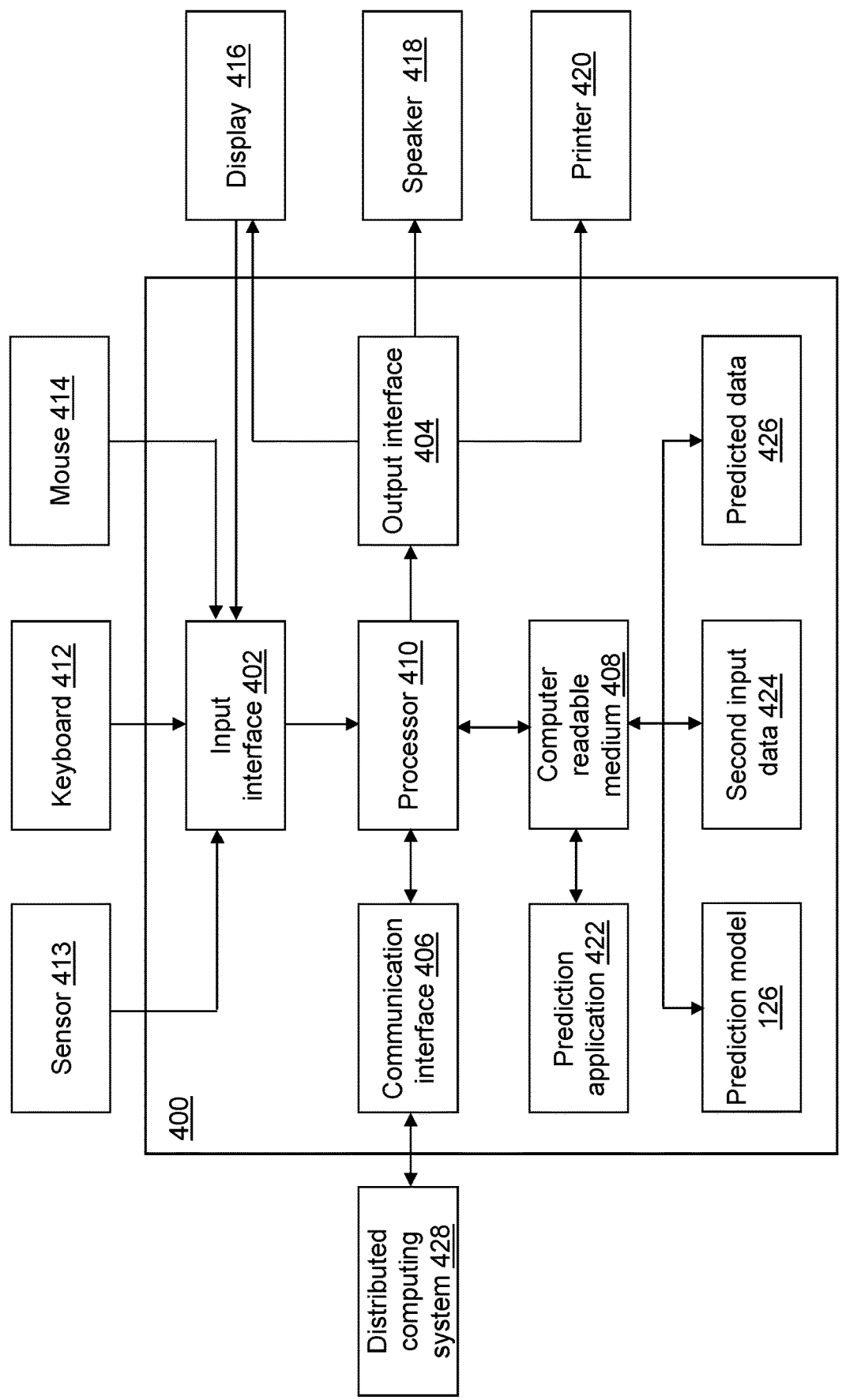
FIG. 4 depicts a block diagram of a prediction device in accordance with an illustrative embodiment.

Model selection application 122 may perform operations associated with selecting a trained prediction model to predict a target value, for example, from data stored in second input data 424 (shown referring to FIG. 4). Some or all of the operations described herein may be embodied in model selection application 122. The operations may be implemented using hardware, firmware, software, or any combination of these methods.

Referring to the example embodiment of FIG. 1, model selection application 122 is implemented in software (comprised of computer-readable and/or computer-executable instructions) stored in computer-readable medium 108 and accessible by processor 110 for execution of the instructions that embody the operations of model selection application 122. Model selection application 122 may be written using one or more programming languages, assembly languages, scripting languages, etc. Model selection application 122 may be integrated with other analytic tools. As an example, model selection application 122 may be part of an integrated data analytics software application and/or software architecture such as that offered by SAS Institute Inc. of Cary, N.C., USA. Merely for illustration, model selection application 122 may be implemented using or integrated with one or more SAS software tools such as Base SAS, SAS® Enterprise Miner™ SAS® Event Stream Processing, SAS/STAT®, SAS® High Performance Analytics Server, SAS® Visual Data Mining and Machine Learning, SAS® LASR™, SAS® In-Database Products, SAS® Scalable Performance Data Engine, SAS® Cloud Analytic Services (CAS), SAS/OR®, SAS/ETS®, SAS® Visual Analytics, SAS® Viya™, SAS® Econometrics, and SAS In-Memory Statistics for Hadoop®, etc. all of which are developed and provided by SAS Institute Inc. of Cary, N.C., USA. Data mining, statistical analytics, and response prediction are practically applied in a wide variety of industries to solve technical problems.

Model selection application 122 may be implemented as a Web application. For example, model selection application 122 may be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an extensible markup language (XML) file, or any other type of file supported by HTTP.

Input data 124 may include, for example, a plurality of rows and a plurality of columns. The plurality of rows may be referred to as observation vectors or records (observations), and the columns may be referred to as variables. In an alternative embodiment, input data 124 may be transposed. Each observation vector includes values defined for each variable of a plurality of variables. The plurality of variables includes a target variable y, a sensitive attribute variable a, and a plurality of attribute variables x. The plurality of attribute variables x may or may not include the sensitive attribute variable a. Each observation vector o may be defined using $o_i=\{x_i,y_i,a_i\}$, i=1, 2, . . . , N, where N is a number of the observation vectors included in input data 124. Input data 124 may also be referred to as a training dataset and may also be subdivided to include a testing dataset. Observation vectors having a common value for the sensitive attribute variable may be referred to as a group. Input data 124 may include additional variables that are not included in the plurality of variables.

Sensor 113 may measure a physical quantity in an environment to which sensor 113 is associated and generate a corresponding measurement datum that may be associated with a time that the measurement datum is generated. The measurement datum may be stored in input data 124. Illustrative sensors include a temperature sensor, a position or location sensor, a heart rate sensor, a blood pressure sensor, a blood glucose sensor, etc. that may be associated with an entity such as an individual.

Input data 124 may include data captured as a function of time for one or more entities. The data stored in input data 124 may be captured at different time points, periodically, intermittently, when an event occurs, etc. Input data 124 may include data captured at a high data rate such as 200 or more observation vectors per second for one or more physical objects. One or more columns of input data 124 may include a time and/or date value. Input data 124 may include data captured under normal and abnormal operating conditions of the physical object.

The data stored in input data 124 may be received directly or indirectly from the source and may or may not be pre-processed in some manner. For example, the data may be pre-processed using an event stream processor such as the SAS® Event Stream Processing Engine (ESPE), developed and provided by SAS Institute Inc. of Cary, N.C., USA. For example, data stored in input data 124 may be generated as part of the IoT, where things (e.g., machines, devices, phones, sensors) can be connected to networks and the data from these things collected and processed within the things and/or external to the things before being stored in input data 124. For example, the IoT can include sensors in many different devices and types of devices, and high value analytics can be applied to identify hidden relationships and drive increased efficiencies. Some of these devices may be referred to as edge devices, and may involve edge computing circuitry. These devices may provide a variety of stored or generated data, such as network data or data specific to the network devices themselves. Again, some data may be processed with an ESPE, which may reside in the cloud or in an edge device before being stored in input data 124.

The data stored in input data 124 may include any type of content represented in any computer-readable format such as binary, alphanumeric, numeric, string, markup language, etc. The content may include textual information, numeric information, etc. that further may be encoded using various encoding techniques as understood by a person of skill in the art.

Input data 124 may be stored on computer-readable medium 108 or on one or more computer-readable media of distributed computing system 128 and accessed by model selection device 100 using communication interface 106 and/or input interface 102. Input data 124 may be stored in various compressed formats such as a coordinate format, a compressed sparse column format, a compressed sparse row format, etc. The data may be organized using delimited fields, such as comma or space separated fields, fixed width fields, using a SAS® dataset, etc. The SAS dataset may be a SAS® file stored in a SAS® library that a SAS® software tool creates and processes. The SAS dataset contains data values that are organized as a table of observation vectors (rows) and variables (columns) that can be processed by one or more SAS software tools.

Input data 124 may be stored using various data structures as known to those skilled in the art including one or more files of a file system, a relational database, one or more tables of a system of tables, a structured query language database, etc. on model selection device 100 or on distributed computing system 128.

Model selection device 100 may coordinate access to input data 124 that is distributed across distributed computing system 128 that may include one or more computing devices. For example, input data 124 may be stored in a cube distributed across a grid of computers as understood by a person of skill in the art. As another example, input data 124 may be stored in a multi-node Hadoop® class. For instance, Apache™ Hadoop® is an open-source software framework for distributed computing supported by the Apache Software Foundation. As another example, input data 124 may be stored in a cloud of computers and accessed using cloud computing technologies, as understood by a person of skill in the art. The SAS® LASR™ Analytic Server may be used as an analytic platform to enable multiple users to concurrently access data stored in input data 124. The SAS Viya open, cloud-ready, in-memory architecture also may be used as an analytic platform to enable multiple users to concurrently access data stored in input data 124. SAS CAS may be used as an analytic server with associated cloud services in SAS Viya. Some systems may use SAS In-Memory Statistics for Hadoop® to read big data once and analyze it several times by persisting it in-memory for the entire session. Some systems may be of other types and configurations.

Referring to FIGS. 2A through 2D, example operations associated with model selection application 122 are described. Additional, fewer, or different operations may be performed depending on the embodiment of model selection application 122. The order of presentation of the operations of FIGS. 2A through 2D is not intended to be limiting. Some of the operations may not be performed in some embodiments. Although some of the operational flows are presented in sequence, the various operations may be performed in various repetitions and/or in other orders than those that are illustrated. For example, a user may execute model selection application 122, which causes presentation of a first user interface window, which may include a plurality of menus and selectors such as drop-down menus, buttons, text boxes, hyperlinks, etc. associated with model selection application 122 as understood by a person of skill in the art. The plurality of menus and selectors may be accessed in various orders. An indicator may indicate one or more user selections from a user interface, one or more data entries into a data field of the user interface, one or more data items read from a command line, one or more data items read from computer-readable medium 108, or one or more data items otherwise defined with one or more default values, etc. that are received as an input by model selection application 122. Some of the operational flows further may be performed in parallel, for example, using a plurality of threads and/or a plurality of computing devices such as may be included in distributed computing system 128.

Figure 2A:
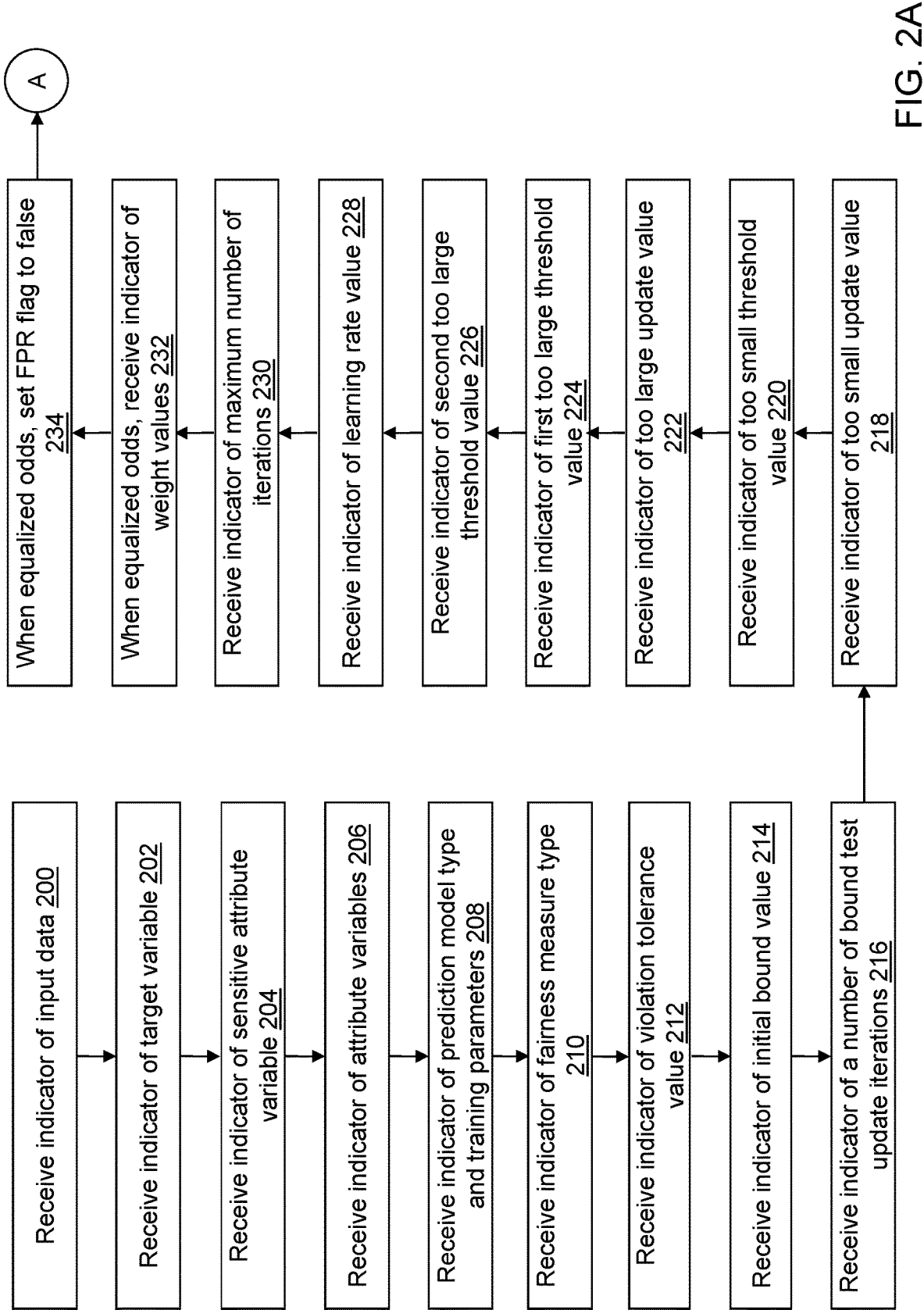
FIGS. 2A through 2D depict a flow diagram illustrating examples of operations performed by a model selection application of the model selection device of FIG. 1 in accordance with an illustrative embodiment.

Referring to FIG. 2A, in an operation 200, a first indicator may be received that indicates input data 124. For example, the first indicator indicates a location and a name of input data 124. As an example, the first indicator may be received by model selection application 122 after selection from a user interface window or after entry by a user into a user interface window. In an alternative embodiment, input data 124 may not be selectable. For example, a most recently created dataset may be used automatically.

In an operation 202, a second indicator may be received that indicates the target variable y to use from input data 124. For example, the second indicator may indicate a column number or a column name. The target variable defines the target variable value $y_i$ for each observation vector.

In an operation 204, a third indicator may be received that indicates the sensitive attribute variable a to use from input data 124. For example, the third indicator may indicate a column number or a column name. The sensitive attribute variable defines the sensitive attribute value $a_i$ for each observation vector such as an ethnicity identifier, a gender identifier, an age, a citizenship country name, a birth country name, a residence country name, a residence city name, a residence neighborhood identifier, a reason code for a decision, etc.

In an operation 206, a fourth indicator may be received that indicates the plurality of attribute variables to use from input data 124. For example, the fourth indicator may indicate a plurality of column numbers, such as a range of column numbers, or a plurality of column names. The plurality of attribute variables are the variables that define each attribute vector $x_i$, where $x_i = x_{i,j}$, j=1, . . . , $N_a$, i=1, . . . , N. $x_{i,j}$ is a $j^{th}$ attribute variable value for the $i^{th}$ observation vector. A number of the plurality of attribute variables may be indicated by $N_a$.

In an operation 208, a fifth indicator may be received that indicates a prediction model type to train. For example, the fifth indicator indicates a name of a prediction model type that performs prediction such as determining a predicted class or label for each observation vector of input data 124. The fifth indicator may be received by model selection application 122 from a user interface window or after entry by a user into a user interface window. A default value for the model type may further be stored, for example, in computer-readable medium 108. As an example, a model type may be selected from "SVM", "K-Cluster", "Neural Network", "Logistic Regression", "Forest", "Gradient Boosting", "Decision Tree", "Factorization Machine", etc. The model type indicated by "SVM" may refer to a support vector machine (SVM) model type. The model type indicated by "K-Cluster" may refer to a k-means clustering model type. The model type indicated by "Neural Network" may refer to a neural network model type. The model type indicated by "Logistic Regression" may refer to a logistic regression model type. The model type indicated by "Forest" may refer to a random forest model type. The model type indicated by "Gradient Boosting" may refer to a gradient boosting model type. The model type indicated by "Decision Tree" may refer to a decision tree model type. The model type indicated by "Factorization Machine" may refer to a factorization machine model type. For example, a default model type may be indicated by "Gradient Boosting". Of course, the model type may be labeled or selected in a variety of different manners by the user as understood by a person of skill in the art. In an alternative embodiment, the model type may not be selectable, and a single model type is implemented by model training application 122. For example, the model type indicated as "Forest" may be used by default or without allowing a selection.

The fifth indicator may further indicate one or more hyperparameters to use for training and validating the indicated model type and/or values for an automatic tuning method (autotune option) as well as other training options such an objective function, training stop criteria, etc. Hyperparameters define values or various options that govern a training process based on the model type. The default values of these hyperparameters may not be suitable for all applications. To reduce the effort in adjusting these hyperparameters, an automatic tuning process may be used to identify the best settings for the hyperparameters though the hyperparameters may optionally be selected as an input option by a user.

In an operation 210, a sixth indicator may be received that indicates a fairness measure type. As an example, a fairness measure type may be selected from "DP", "EOp", "PP", "EA". "EOd", etc. In an alternative embodiment, the sixth indicator may not be received. For example, a default fairness measure type may be used automatically and/or may not be selectable. Instead, a predefined fairness measure type may be used. For illustration, a default fairness measure type may be "DP" if one is not indicated using the sixth indicator. Of course, the fairness measure type may be labeled or selected in a variety of different manners by the user as understood by a person of skill in the art.

For illustration, DP indicates the demographic parity fairness measure type, EOp indicates the equalized opportunity fairness measure type, PP indicates the predictive parity fairness measure type, EA indicates the equal accuracy fairness measure type, and EOd indicates the equalized odds fairness measure type. The predictive parity fairness measure type determines a maximum pairwise difference in the predicted variable Y corresponding to an event level. The equal accuracy fairness measure type determines a maximum pairwise difference in an accuracy measure.

The fairness measure type indicates a type of statistics to compute for each trained prediction model and to use as the basis for selecting the best prediction model from among those indicated in operation 208. For example, the mathematical equation for EOp is Probability(Y=1|A=0, Y*=1) =Probability(Y=1|A=1, Y*=1), where Y* is the binary ground truth label. Using the example of a job application, EOp strives to achieve the same odds of passing a job screening regardless of the value of the sensitive attribute meaning the screening decision is conditionally independent of the sensitive attribute value given actual job success.

From the perspective of a confusion matrix, EOp means the true positive rate (TPR) is independent of the sensitive attribute value.

For example, the mathematical equation for EOd is Probability($Y=1|A=0,Y^*=1$)=Probability($Y=1|A=1,Y^*=1$) and Probability($Y=1|A=0,Y^*=0$)=Probability($Y=1|A=1, Y^*=0$). Equalized Odds requires that a parity of the TPR and a parity of a false positive rate (FPR) of sensitive sub-groups are as close as possible. Equalized odds overcomes the issue that DP rules out perfect classifiers whenever Y is correlated with A and makes random predictions for data points with A not equal to 1 as long as the probabilities of $Y(x)=1$ match.

In an operation 212, a seventh indicator of a violation tolerance value c may be received. In an alternative embodiment, the seventh indicator may not be received. For example, a default value may be stored, for example, in computer-readable medium 108 and used automatically. In another alternative embodiment, the value for the violation tolerance may not be selectable. Instead, a fixed, predefined value may be used. For illustration, a default value for the violation tolerance value c may be c=0.1 though other values may be used. The violation tolerance value c is applied to fairness constraints that are defined based on the fairness measure type indicated in operation 210 as described further below.

In an operation 214, an eighth indicator of an initial bound value $b_0$ may be received. In an alternative embodiment, the eighth indicator may not be received. For example, a default value may be stored, for example, in computer-readable medium 108 and used automatically. In another alternative embodiment, the value for the initial bound may not be selectable. Instead, a fixed, predefined value may be used. For illustration, a default value for the initial bound may be $b_0=10$ though other values may be used.

In an operation 216, a ninth indicator of a number of bound test update iterations $t_b$ may be received. In an alternative embodiment, the ninth indicator may not be received. For example, a default value may be stored, for example, in computer-readable medium 108 and used automatically. In another alternative embodiment, the number of bound test update iterations $t_b$ may not be selectable. Instead, a fixed, predefined value may be used. For illustration, a default value for the number of bound test update iterations $t_b$ may be $t_b=3$ though other values may be used. The number of bound test update iterations $t_b$ may be greater than or equal to three.

In an operation 218, a tenth indicator of a too small update value $d_s$ may be received. In an alternative embodiment, the tenth indicator may not be received. For example, a default value may be stored, for example, in computer-readable medium 108 and used automatically. In another alternative embodiment, the too small update value $d_s$ may not be selectable. Instead, a fixed, predefined value may be used. For illustration, a default value for the too small update value $d_s$ may be $d_s=5$ though other values may be used. The too small update value $d_s$ defines a factor used to adjust the bound value when the determination is that the bound value is too small as described further below.

In an operation 220, an eleventh indicator of a too small threshold value $T_s$ may be received. In an alternative embodiment, the eleventh indicator may not be received. For example, a default value may be stored, for example, in computer-readable medium 108 and used automatically. In another alternative embodiment, the too small threshold value $T_s$ may not be selectable. Instead, a fixed, predefined value may be used. For illustration, a default value for the too small threshold value $T_s$ may be $T_s=0.15$ though other values may be used. The too small threshold value $T_s$ defines a threshold value used to determine that the bound value is too small as described further below.

In an operation 222, a twelfth indicator of a too large update value $d_l$ may be received. In an alternative embodiment, the tenth indicator may not be received. For example, a default value may be stored, for example, in computer-readable medium 108 and used automatically. In another alternative embodiment, the too large update value $d_l$ may not be selectable. Instead, a fixed, predefined value may be used. For illustration, a default value for the too large update value $d_l$ may be $d_l=2$ though other values may be used. The too large update value $d_l$ defines a factor used to adjust the bound value when the determination is that the bound value is too large as described further below.

In an operation 224, a thirteenth indicator of a first too large threshold value $T_{l1}$ may be received. In an alternative embodiment, the thirteenth indicator may not be received. For example, a default value may be stored, for example, in computer-readable medium 108 and used automatically. In another alternative embodiment, the first too large threshold value $T_{l1}$ may not be selectable. Instead, a fixed, predefined value may be used. For illustration, a default value for the first too large threshold value $T_{l1}$ may be $T_{l1}=0.05$ though other values may be used. The first too large threshold value $T_{l1}$ defines a first threshold value used to determine that the bound value is too large as described further below.

In an operation 226, a fourteenth indicator of a second too large threshold value $T_{l2}$ may be received. In an alternative embodiment, the fourteenth indicator may not be received. For example, a default value may be stored, for example, in computer-readable medium 108 and used automatically. In another alternative embodiment, the second too large threshold value $T_{l2}$ may not be selectable. Instead, a fixed, predefined value may be used. For illustration, a default value for the second too large threshold value $T_{l2}$ may be $T_{l2}=0.04$ though other values may be used. The second too large threshold value $T_{l2}$ defines a second threshold value used to determine that the bound value is too large as described further below.

In an operation 228, a fifteenth indicator of a learning rate value l may be received. In an alternative embodiment, the fifteenth indicator may not be received. For example, a default value may be stored, for example, in computer-readable medium 108 and used automatically. In another alternative embodiment, the learning rate value l may not be selectable. Instead, a fixed, predefined value may be used. For illustration, a default value for the learning rate value l may be l=0.01 though other values may be used.

In an operation 230, a sixteenth indicator of a maximum number of iterations $t_{max}$ may be received. In an alternative embodiment, the sixteenth indicator may not be received. For example, a default value may be stored, for example, in computer-readable medium 108 and used automatically. In another alternative embodiment, the maximum number of iterations $t_{max}$ may not be selectable. Instead, a fixed, predefined value may be used. For illustration, a default value for the maximum number of iterations $t_{max}$ may be $t_{max}=20$ though other values may be used. The maximum number of iterations $t_{max}$ defines a maximum number of iterations performed by the EGR method before processing is stopped as described further below.

In an operation 232, when the fairness measure type indicated in operation 210 is EOd, an eighteenth indicator of a TPR weight value $w_{TPR}$ and an FPR weight value $w_{FPR}$ may be received. In an alternative embodiment, the eighteenth indicator may not be received. For example, default values may be stored, for example, in computer-readable medium 108 and used automatically. In another alternative embodiment, the TPR weight value $w_{TPR}$ and the FPR weight value $w_{FPR}$ may not be selectable. Instead, fixed, predefined values may be used. For illustration, default values for the TPR weight value $w_{TPR}$ and the FPR weight value $w_{FPR}$ may be $w_{TPR}=0.5$ and $w_{FPR}=0.5$, respectively, though other values may be used. The TPR weight value $w_{TPR}$ and FPR weight value $w_{FPR}$ define weights for computing the bound value from bound values determined based on the TPR and based on the FPR.

Figure 2B:
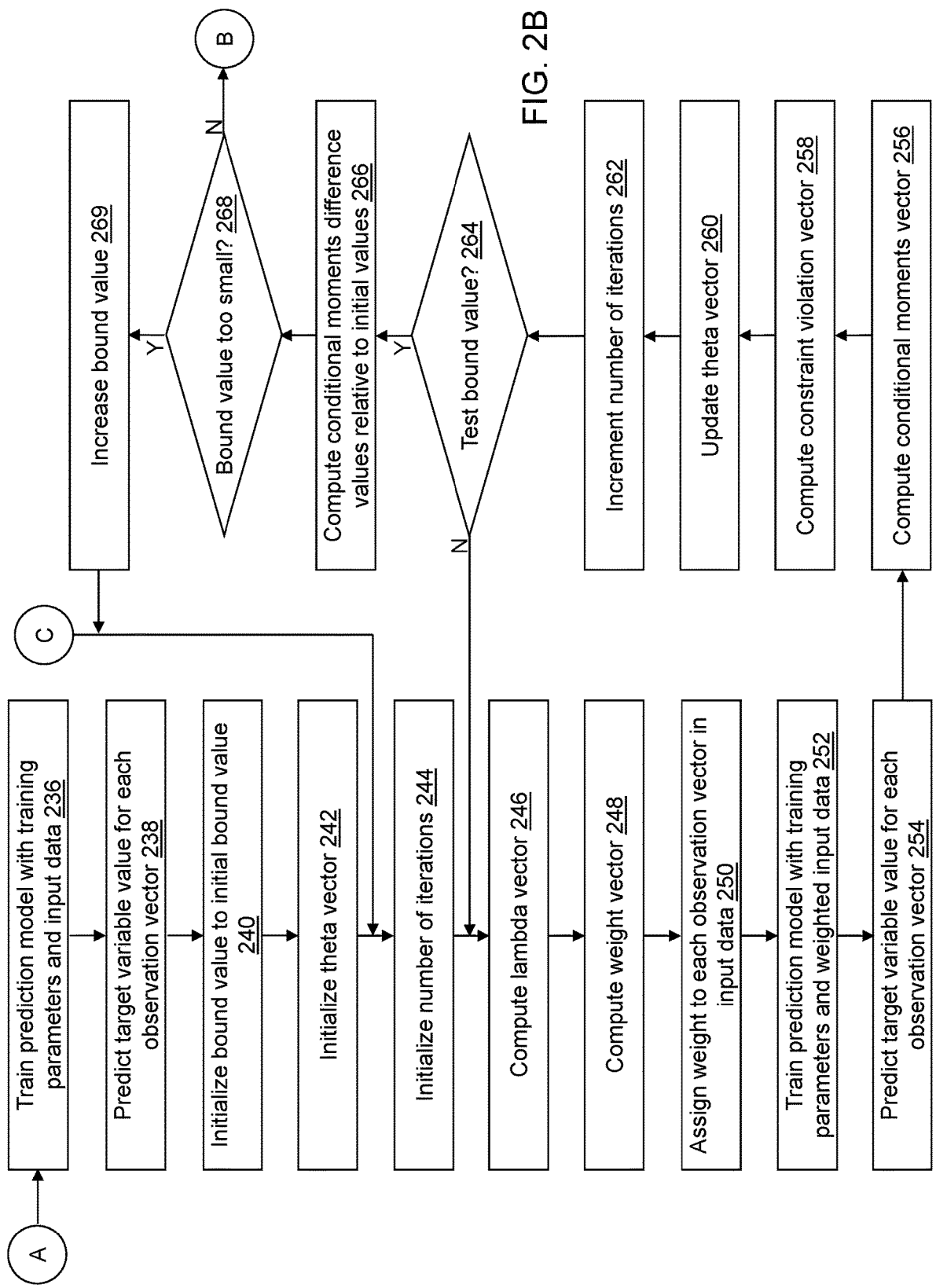
Figure 2C:
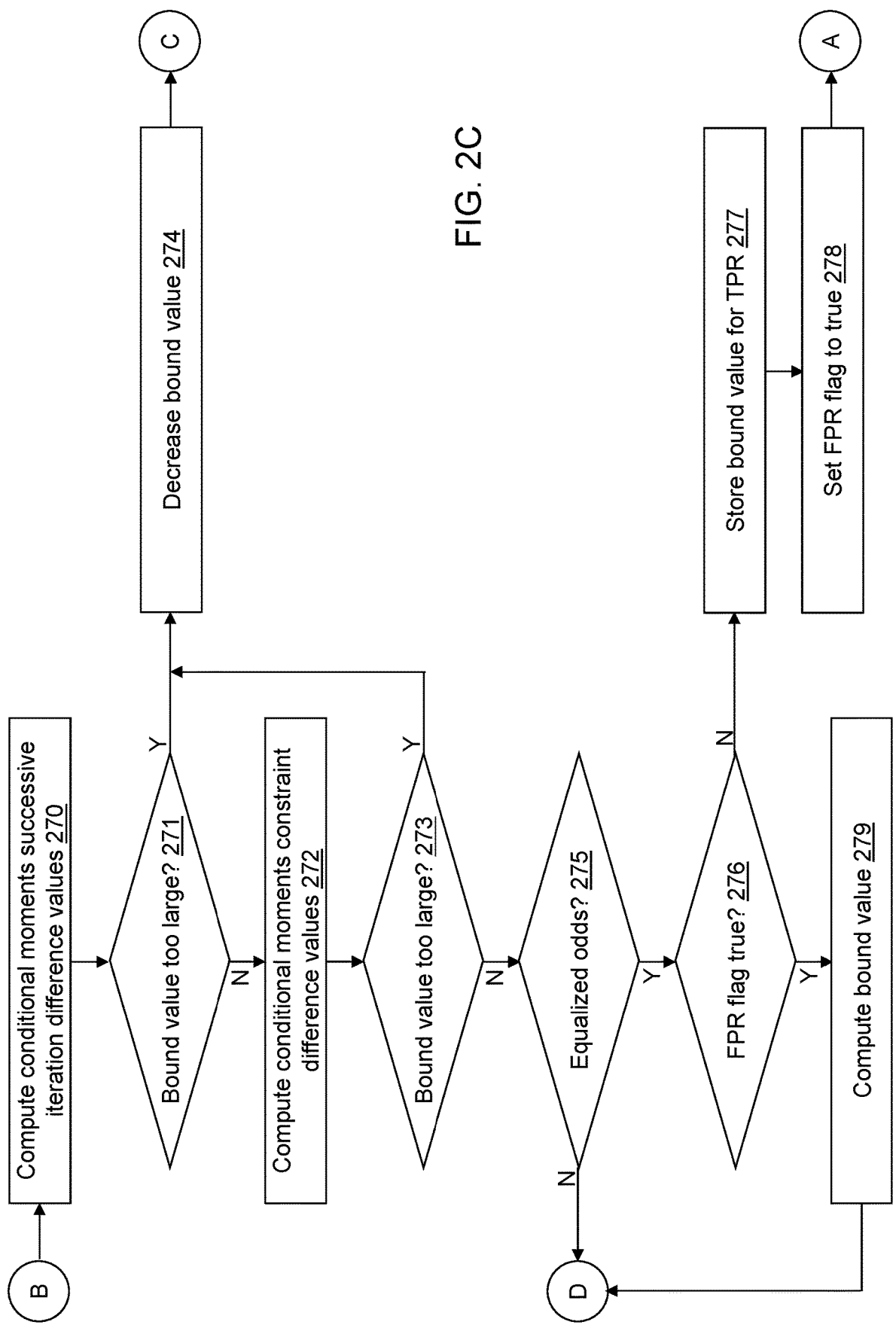

In an operation 234, when the fairness measure type indicated in operation 210 is EOd, an FPR flag FPR is initialized to false, for example, using FPR=0, and processing continues in an operation 236 shown referring to FIG. 2B.

Referring to FIG. 2B, in operation 236, a prediction model is trained using each observation vector read from input data 124 based on the prediction model type and the training parameters indicated in operation 208. For example, the model may be trained and validated using another application that is distinct from model training application 122 or is integrated with model training application 122. For illustration, a TREESPLIT Procedure included in SAS® Visual Data Mining and Machine Learning 8.1: Statistical Procedures developed and provided by SAS Institute Inc. of Cary, N.C., USA may be used for a decision tree model type; a FACTMAC procedure included in SAS® Visual Data Mining and Machine Learning 8.1: Data Mining and Machine Learning Procedures developed and provided by SAS Institute Inc. of Cary, N.C., USA may be used for a factorization machine model type; a FOREST procedure included in SAS® Visual Data Mining and Machine Learning 8.1: Data Mining and Machine Learning Procedures developed and provided by SAS Institute Inc. of Cary, N.C., USA may be used for a random forest model type; a GRADBOOST procedure included in SAS® Visual Data Mining and Machine Learning 8.1: Data Mining and Machine Learning Procedures developed and provided by SAS Institute Inc. of Cary, N.C., USA may be used for a gradient boosting model type; a NNET procedure included in SAS® Visual Data Mining and Machine Learning 8.1: Data Mining and Machine Learning Procedures developed and provided by SAS Institute Inc. of Cary, N.C., USA may be used for a gradient boosting model type; a SVMACHINE procedure included in SAS® Visual Data Mining and Machine Learning 8.1: Data Mining and Machine Learning Procedures developed and provided by SAS Institute Inc. of Cary, N.C., USA may be used for a support vector machine model type; a HPLOGISTIC procedure included in SAS/STAT® 15.1 developed and provided by SAS Institute Inc. of Cary, N.C., USA may be used for a logistic regression model type; and a KCLUS procedure included in SAS® Visual Data Mining and Machine Learning 8.1: Statistical Procedures developed and provided by SAS Institute Inc. of Cary, N.C., USA may be used for a k-means clustering model type; etc.

In an operation 238, the trained prediction model is executed with each observation vector in input data 124 to define a predicted target variable value $y_{p,i}$, $i=1, \ldots, N$ for each observation vector.

In an operation 240, the bound value B is initialized to the initial bound value indicated in operation 214 using $B=b_0$.

In an operation 242, a theta vector $\theta_1$ is initialized to zeroes using $\theta_{1,i}=0$, $i=1, \ldots, N_C$, where $N_C$ indicates a number of constraints where the number of constraints is based on the fairness constraints defined based on the fairness measure type indicated in operation 210. For example, $N_C=4$ for DP and EOp. For example, $N_C=8$ for EOd for TPR and for FPR. The TPR and FPR are processed in two loops of operation 236 through 278 as described further below.

In an operation 244, a number of iterations $N_I$ is initialized, for example, using $N_I=1$.

In an operation 246, a lambda vector $\lambda_{N_I}$ is computed for the current iteration defined by $N_I$ using $$\lambda_{N_I,i} = \frac{B * \exp(\theta_{N_I,i})}{1 + \sum_{k=1}^{N_C} \exp(B * \theta_{N_I,k})}, i = 1, \ldots, N_C.$$

In an operation 248, a weight vector $w_{N_I}$ is computed for the current iteration based on the fairness constraints defined based on the fairness measure type indicated in operation 210. For example, for DP, $$w_{N_I,1} = \left| 1 - \frac{\lambda_{N_I,1} - \lambda_{N_I,2}}{p_0} + (\lambda_{N_I,1} - \lambda_{N_I,2}) + (\lambda_{N_I,3} - \lambda_{N_I,4}) \right|,$$

$$w_{N_I,2} = \left| 1 - \frac{\lambda_{N_I,3} - \lambda_{N_I,4}}{p_1} + (\lambda_{N_I,1} - \lambda_{N_I,2}) + (\lambda_{N_I,3} - \lambda_{N_I,4}) \right|,$$

$$w_{N_I,3} = \left| 1 + \frac{\lambda_{N_I,1} - \lambda_{N_I,2}}{p_0} - (\lambda_{N_I,1} - \lambda_{N_I,2}) - (\lambda_{N_I,3} - \lambda_{N_I,4}) \right|, \text{ and}$$

$$w_{N_I,4} = \left| 1 + \frac{\lambda_{N_I,3} - \lambda_{N_I,4}}{p_1} - (\lambda_{N_I,1} - \lambda_{N_I,2}) - (\lambda_{N_I,3} - \lambda_{N_I,4}) \right|,$$

where | | indicates an absolute value, $p_0$ indicates a percentage of the observations in input data 124 having a=0, and $p_1$ indicates a percentage of the observations in input data 124 having a=1. For example, for EOp, $$w_{N_I,1} = \left| 1 - \frac{\lambda_{N_I,1} - \lambda_{N_I,2}}{p_{20}} + \frac{(\lambda_{N_I,1} - \lambda_{N_I,2}) - (\lambda_{N_I,3} - \lambda_{N_I,4})}{p_2} \right|,$$

$$w_{N_I,2} = \left| 1 - \frac{\lambda_{N_I,3} - \lambda_{N_I,4}}{p_{21}} + \frac{(\lambda_{N_I,1} - \lambda_{N_I,2}) - (\lambda_{N_I,3} - \lambda_{N_I,4})}{p_2} \right|,$$

and $w_{N_I,3}-1$, where $p_{20}$ indicates a percentage of the observations in input data 124 having a=0 and $y_p=1$, $p_{21}$ indicates a percentage of the observations in input data 124 having a=1 and $y_p=1$, and $p_2$ indicates a percentage of the observations in input data 124 having $y_p=1$. For example, for EOd, $$w_{N_I,1} = \left| 1 - \frac{\lambda_{N_I,1} - \lambda_{N_I,2}}{p_{20}} + \frac{(\lambda_{N_I,1} - \lambda_{N_I,2}) - (\lambda_{N_I,3} - \lambda_{N_I,4})}{p_2} \right|,$$

$$w_{N_I,2} = \left| 1 - \frac{\lambda_{N_I,3} - \lambda_{N_I,4}}{p_{21}} + \frac{(\lambda_{N_I,1} - \lambda_{N_I,2}) - (\lambda_{N_I,3} - \lambda_{N,4})}{p_2} \right|,$$

$$w_{N_I,5} = \left| 1 - \frac{\lambda_{N_I,5} - \lambda_{N_I,6}}{p_{30}} + \frac{(\lambda_{N_I,5} - \lambda_{N_I,6}) - (\lambda_{N_I,7} - \lambda_{N_I,8})}{p_3} \right|,$$

$$w_{N_I,6} = \left| 1 - \frac{\lambda_{N_I,7} - \lambda_{N_I,8}}{p_{31}} + \frac{(\lambda_{N_I,5} - \lambda_{N_I,6}) - (\lambda_{N_I,7} - \lambda_{N_I,8})}{p_3} \right|,$$

where $p_{30}$ indicates a percentage of the observations in input data 124 having a=0 and $y_p=0$, $p_{31}$ indicates a percentage of the observations in input data 124 having a=1 and $y_p$=0, and $p_3$ indicates a percentage of the observations in input data 124 having $y_p$=0.

In an operation 250, a weight value is assigned to each observation vector in input data 124 based on a and $y_p$. For example, for DP, when $a_i$=0 and $y_{p,i}$=1 for the $i^{th}$ observation vector, $w_i=w_{N_I,1}$; when $a_i$=1 and $y_{p,i}$=1 for the $i^{th}$ observation vector, $w_i=w_{N_I,2}$; when $a_i$=0 and $y_{p,i}$=0 for the $i^{th}$ observation vector, $w_i=w_{N_I,3}$; and when $a_i$=1 and $y_{p,i}$=0 for the $i^{th}$ observation vector, $w_i=w_{N_I,4}$. For example, for EOp, when $a_i$=0 and $y_{p,i}$=1 for the $i^{th}$ observation vector, $w_i=w_{N_I,1}$; when $a_i$=1 and $y_{p,i}$=1 for the $i^{th}$ observation vector, $w_i=w_{N_I,2}$; and when $y_{p,i}$=0 for the $i^{th}$ observation vector, $w_i=w_{N_I,3}$. For example, for EOd, when $a_i$=0 and $y_{p,i}$=1 for the $i^{th}$ observation vector, $w_i=w_{N_I,1}$; when $a_i$=1 and $y_{p,i}$=1 for the $i^{th}$ observation vector, $w_i=w_{N_I,2}$; and when $a_i$=1 and $y_{p,i}$=0 for the $i^{th}$ observation vector, $w_i=w_{N_I,5}$; and when $a_i$=0 and $y_{p,i}$=0 for the $i^{th}$ observation vector, $w_i=w_{N_I,6}$.

In an operation 252, the prediction model is trained using each observation vector read from input data 124 with the variable value of each variable of the plurality of variables multiplied by the weight assigned to each respective observation vector, or $w_i * x_i$, i=1, . . . , N. Training the prediction model in operation 252 is similar to that performed in operation 234 except that the observation vectors are weighted using the weights assigned in operation 250.

In an operation 254, the prediction model trained in operation 252 is executed with each observation vector in input data 124 to define a predicted target variable value $y_{p,i}$, i=1, . . . , N for each observation vector.

In an operation 256, a conditional moments vector $\mu_{N_I}$ is computed for the current iteration $N_I$ based on the fairness constraints defined based on the fairness measure type indicated in operation 210. For example, for DP, $\mu_{N_I,0}$=Probability($y_p$=1|a=0), $\mu_{N_I,1}$=Probability($y_p$=1|a=1), and $\mu_{N_I,All}$=Probability($y_p$=1), where $y_p$ indicates the predictions from a most recent execution of operation 254. $\mu_{N_I,0}$ indicates the probability of a positive prediction for sensitive attribute group zero; $\mu_{N_I,1}$ indicates the probability of a positive prediction for sensitive attribute group one; and $\mu_{N_I,All}$ indicates the probability of a positive prediction across all of the observation vectors. For example, for EOp, $\mu_{N_I,0}$=Probability(y=1|a=0, $y_p$=1), $\mu_{N_I,1}$=Probability(y=1|a=1, $y_p$=1), and $\mu_{N_I,All}$=Probability(y=1|$y_p$=1). For example, for EOd and FPR=0, $\mu_{N_I,0}$=Probability(y=1|a=0, $y_p$=1), $\mu_{N_I,1}$=Probability(y=1|a=1, $y_p$=1), and $\mu_{N_I,All}$=Probability(y=1|$y_p$=1), and, for EOd and FPR=1, $v_{N_I,0}$=Probability(y=1|a=0, $y_p$=0), $v_{N_I,1}$=Probability(y=1|a=1, $y_p$=0), and $v_{N_I,All}$=Probability(y=1|$y_p$=0). $v_{N_I,0}$ indicates the probability of a false positive prediction for sensitive attribute group zero; $v_{N_I,1}$ indicates the probability of a false positive prediction for sensitive attribute group one; and $v_{N_I,All}$ indicates the probability of a false positive prediction across all of the observation vectors.

In an operation 258, a constraint violation vector $\gamma$ is computed for the current iteration based on the fairness constraints defined based on the fairness measure type indicated in operation 210. For example, for DP and EOp, the constraint violation vector $\gamma$ includes four constraint violations, $\gamma=(\gamma_1, \gamma_2, \gamma_3, \gamma_4)$, where $\gamma_1=\mu_{N_I,0}-\mu_{N_I,All}$, $\gamma_2=-\mu_{N_I,0}+\mu_{N_I,All}$, $\gamma_3=\mu_{N_I,1}-\mu_{N_I,All}$, and $\gamma_4=-\mu_{N_I,1}+\mu_{N_I,All}$. For example, for EOd, the constraint violation vector $\gamma$ includes eight constraint violations, $=(\gamma_1, \gamma_2, \gamma_3, \gamma_4, \gamma_5, \gamma_6, \gamma_7, \gamma_8)$, where $\gamma_1=\mu_{N_I,0}-\mu_{N_I,All}$, $\gamma_2=\mu_{N_I,0}+\mu_{N_I,All}$, $\gamma_3=\mu_{N_I,1}-\mu_{N_I,All}$, $\gamma_4=\mu_{N_I,1}+\mu_{N_I,All}$, $\gamma_5=\mu_{N_I,0}-\mu_{N_I,All}$, $\gamma_6=-\mu_{N_I,0}+\mu_{N_I,All}$, $\gamma_7=\mu_{N_I,1}-\mu_{N_I,All}$, and $\gamma_8=-\mu_{N_I,1}+\mu_{N_I,All}$.

In an operation 260, the theta vector $\theta_I$ is updated for the next iteration using $\theta_{N_I+1,i}+\theta_{N_I,i}+1*\gamma$, i=1, . . . , $N_C$, where l indicates the learning rate value indicated in operation 228.

In an operation 262, the number of iterations $N_I$ is incremented, for example, using $N_I=N_I+1$.

In an operation 264, a determination is made concerning whether the bound value is to be tested. When the bound value is to be tested, processing continues in an operation 266. When the bound value is not to be tested, processing continues in operation 246. For example, the bound value is tested every number of iterations defined by the number of bound test update iterations indicated in operation 216. For illustration, the bound value is to be tested when $N_I > t_b$.

In operation 266, conditional moments difference values $\Delta\mu_{j,k}$ are computed for the most recent set of iterations. For example, $$\Delta\mu_{j,0} = \frac{|\mu_{1,0} - \mu_{j,0}|}{|\mu_{1,0}|}, j = 2, \ldots, t_b, \text{ and}$$

$$\Delta\mu_{j,1} = \frac{|\mu_{1,1} - \mu_{j,1}|}{|\mu_{1,1}|}, j = 2, \ldots, t_b.$$

In an operation 268, a determination is made concerning whether the bound value B is too small. When the bound value B is too small, processing continues in an operation 269. When the bound value B is not too small, processing continues in an operation 270 shown referring to FIG. 3C. For illustration, the bound value B is too small when $\Delta\mu_{j,k} < T_s$, j=2, . . . , $t_b$, k=0, . . . , 0.5*$N_c$ for any value of $\Delta\mu_{j,k}$, where $T_s$ indicates the too small threshold value indicated in operation 220. The bound value B is determined to be too small based on a comparison between the fairness constraints for the first iteration for each sensitive attribute group and the fairness constraints of the remaining iterations computed in the loop from operations 246 through 264. When the fairness constraints do not change very much between the first iteration and the remaining iterations, the bound value is determined to be too small.

In operation 269, the bound value is increased, and processing continues in operation 244 to perform the number of bound test update iterations indicated in operation 216. For illustration, the bound value is increased using B=B*$d_s$, where $d_s$ indicates the too small update value $d_s$ indicated in operation 218.

Referring to FIG. 3C, in operation 270, conditional moments successive iteration difference values $\Delta\mu_{j,k}$ are computed for the most recent set of iterations. For example, $\Delta\mu_{j,k}=|\mu_{j,k}-\mu_{j+1,k}|$, j=1, . . . , $t_b$-1, k=0, . . . , 0.5*$N_c$.

In an operation 271, a first determination is made concerning whether the bound value B is too large. When the bound value B is too large, processing continues in an operation 274. When the bound value B is not too large, processing continues in an operation 272. For illustration, the bound value B is too large when $\Delta\mu_{1,k} \geq T_{l1}$, k=0, . . . , 0.5*$N_c$ or $\Delta\mu_{2,k} \geq T_{l1}$, k=0, . . . , 0.5*$N_c$ and when $\Delta\mu_{1,k} * \Delta\mu_{2,k} < 0$ for k=0, . . . , 0.5*$N_c$, where $T_{l1}$ indicates the first too large threshold value indicated in operation 224.

In operation 272, conditional moments constraint difference values $\Delta\mu_j$ are computed for the most recent set of iterations. For example, $\Delta\mu_j=\mu_{j,0}-\mu_{j,1}$, j=1, . . . , $t_b$.

In an operation 273, a second determination is made concerning whether the bound value B is too large. When the bound value B is too large, processing continues in operation 274. When the bound value B is not too large, processing continues in an operation 275. For illustration, the bound value B is too large when $\Delta\mu_1<0$ and $\Delta\mu_j>T_{l2}$, $j=2, \ldots, t_b$ for any value of $\Delta\mu_j$ or when $\Delta\mu_1>0$ and $\Delta\mu_j<-T_{l2}$, $j=2, \ldots, t_b$ for any value of $\Delta\mu_j$, where $T_{l2}$ indicates the second too large threshold value indicated in operation 226.

The bound value B is determined to be too large based on two different behaviors: a cyclic/oscillating pattern as shown referring to FIG. 3B and overshooting as shown referring to FIG. 3C. Operation 271 is designed to detect the cyclic/oscillating pattern, and operation 273 is designed to detect the overshooting. The cyclic/oscillating pattern is detected based on a comparison between the fairness constraints for each sensitive attribute group in successive iterations of the loop from operations 246 through 264 all exceeding the first too large threshold value and changing such that successive iterations are above and then below each other as measured by $\Delta\mu_{1,k}*\Delta\mu_{2,k}<0$. Overshooting is the behavior that involves a comparison between the fairness constraints for different groups from the same iteration to capture the behavior that the solutions pass the optimization saddle points. Overshooting is detected based on a comparison of the fairness constraints computed between each sensitive attribute group for each iteration of the loop from operations 246 through 264.

In operation 274, the bound value is decreased, and processing continues in operation 244 to perform the number of bound test update iterations indicated in operation 216. For illustration, the bound value is decreased using $B=B/d_l$, where $d_l$ indicates the too large update value $d_l$ indicated in operation 222.

The purpose of the inner loop defined by operations 246 through 264 is to provide data points for the fairness measure for each sensitive attribute group over the number of bound test update iterations based on a current bound value B. After completing the number of bound test update iterations, the fairness measure data is evaluated in operations 266 through 273 to determine whether the current bound value B is too large or too small. If the bound value B is too small, there is not enough momentum to close the gap of between the fairness measures for the sensitive attribute groups. On the other hand, if the bound value B is too large, the solutions tend to oscillate and/or overshoot resulting in poor performance as well as illustrated in FIGS. 3A through 3C. Operations 269 and 274 adjust the bound value B because it is too small or too large, respectively, and initiate a next number of bound test update iterations.

In operation 275, a determination is made concerning whether the fairness measure type indicated in operation 210 is EOd. When the fairness measure type is EOd, processing continues in an operation 276. When the fairness measure type is not EOd, processing continues in an operation 280 shown referring to FIG. 2D because selection of the optimal bound value is complete. As stated previously, using EOd, there are eight constraints for the TPR that are executed first, in the illustrative embodiment, and eight constraints for the FPR that are executed second, in the illustrative embodiment. For example, when FPR=0, the computations are performed using the TPR, and when FPR=1, the computations are performed using the FPR.

In operation 276, a determination is made concerning whether FPR=1. When FPR=1, processing continues in an operation 279. When FPR≠1, processing continues in an operation 277.

In operation 277, the bound value computed based on the TPR is stored, for example, using $B_{TPR}=B$.

In an operation 278, the FPR flag FPR is set to true, for example, using FPR=1, and processing continues in operation 236 to compute $B_{FPR}$.

In operation 279, the bound value for the fairness measure type EOd is computed, for example, using $B=w_{TPR}*B_{TPR}+w_{FPR}*B$, and processing continues in operation 280.

Figure 2D:
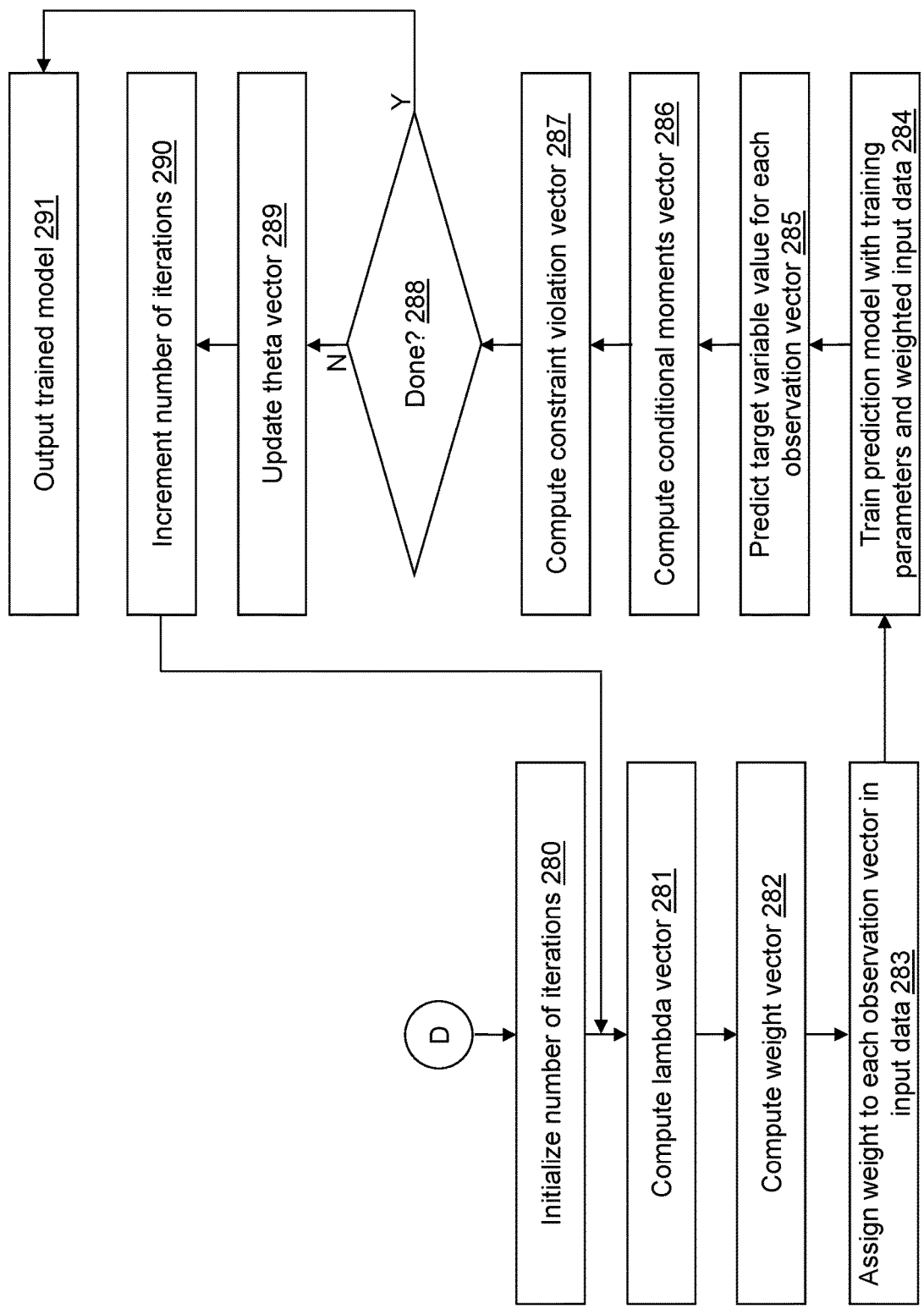

Referring to FIG. 2D, in operation 280, the number of iterations $N_I$ is initialized, for example, using $N_I=1$.

Similar to operation 246, in an operation 281, the lambda vector $\lambda_{N_I}$ is computed for the current iteration defined by $N_I$ using $$\lambda_{N_I,i} = \frac{B*\exp(\theta_{N_I,i})}{1 + \sum_{k=1}^{N_C}\exp(B*\theta_{N_I,k})}, i = 1, \ldots, N_c.$$

Similar to operation 248, in an operation 282, a weight vector $w_{N_I}$ s computed for the current iteration based on the fairness constraints defined based on the fairness measure type indicated in operation 210.

Similar to operation 250, in an operation 283, a weight value is assigned to each observation vector in input data 124 based on a and $y_p$.

Similar to operation 252, in an operation 284, the prediction model is trained using each observation vector read from input data 124 with the variable value of each variable of the plurality of variables multiplied by the weight assigned to each respective observation vector in operation 283.

Similar to operation 254, in an operation 285, the prediction model trained in operation 284 is executed with each observation vector in input data 124 to define a predicted target variable value $y_{p,i}$, $i=1, \ldots, N$ for each observation vector.

Similar to operation 256, in an operation 286, a conditional moments vector µ is computed for the current iteration based on the fairness constraints defined based on the fairness measure type indicated in operation 210.

Similar to operation 258, in an operation 287, a constraint violation vector γ is computed for the current iteration based on the fairness constraints defined based on the fairness measure type indicated in operation 210.

In an operation 288, a determination is made concerning whether the fair prediction model training is done. When the fair prediction model training is done, processing continues in an operation 291. When the fair prediction model training is not done, processing continues in an operation 289. For example, the violation tolerance value c indicated in operation 212 is compared to the constraint violation vector γ, and/or the maximum number of iterations $t_{max}$ indicated in operation 230 is compared to the number of iterations $N_I$. For illustration, the fair prediction model training is done when $N_I>t_{max}$ or when γ<c.

Similar to operation 260, in an operation 289, the theta vector $\theta_I$ is updated for the next iteration using $\theta_{N_I+1,i}=\theta_{N_I,i}+l*\gamma$, $i=1, \ldots, N_C$, where l indicates the learning rate value indicated in operation 228.

Similar to operation 262, in an operation 290, the number of iterations $N_I$ is incremented, for example, using $N_I=N_I+1$, and processing continues in operation 281 to process a next iteration. Operations 280 through 290 train the best fair prediction model based on the bound value B determined, from operations 244 through 278, as being neither too small nor too large.

In operation 291, the prediction model type trained in the most recent iteration of operation 284 is selected and may be output as the best fair prediction model from all of the prediction model types trained in operation 284. For example, the parameters estimated for the selected best fair prediction model type may be output to prediction model 126. Additional, information may further be output.

Referring to FIGS. 8A through 8E, additional example operations associated with model selection application 122 are described in an alternative embodiment. The additional example operations associated with model selection application 122 determine a bound value using an EOd fairness measure type in an alternative embodiment. Additional, fewer, or different operations may be performed depending on the embodiment of model selection application 122. The order of presentation of the operations of FIGS. 8A through 8E is not intended to be limiting. Some of the operations may not be performed in some embodiments. Although some of the operational flows are presented in sequence, the various operations may be performed in various repetitions and/or in other orders than those that are illustrated. Some of the operational flows further may be performed in parallel, for example, using a plurality of threads and/or a plurality of computing devices such as may be included in distributed computing system 128.

In the alternative embodiment, model selection application 122 may perform operations 200 through 208, 212, 214, 216, 218, 222, 228, and 230.

In an operation 800, a seventeenth indicator of a TPR too small threshold value $T_{sT}$ and of an FPR too small threshold value $T_{sF}$ may be received. In an alternative embodiment, the seventeenth indicator may not be received. For example, a default value may be stored, for example, in computer-readable medium 108 and used automatically. In another alternative embodiment, the TPR too small threshold value $T_{sT}$ and the FPR too small threshold value $T_{sF}$ may not be selectable. Instead, fixed, predefined values may be used. For illustration, a default value for the TPR too small threshold value $T_{sT}=0.15$ and the FPR too small threshold value $T_{sF}=0.15$ may be used.

In an operation 801, an eighteenth indicator of a first TPR too large threshold value $T_{lT1}$ and of first FPR too large threshold value $T_{lF1}$ may be received.

In an alternative embodiment, the eighteenth indicator may not be received. For example, a default value may be stored, for example, in computer-readable medium 108 and used automatically. In another alternative embodiment, the first TPR too large threshold value $T_{lT1}$ and the first FPR too large threshold value $T_{lF1}$ may not be selectable. Instead, fixed, predefined values may be used. For illustration, a default value for the first TPR too large threshold value $T_{lT1}=0.05$ and the first FPR too large threshold value $T_{lF1}=0.05$ may be used.

In an operation 802, a nineteenth indicator of a second TPR too large threshold value $T_{lT2}$ and of a second FPR too large threshold value $T_{lF2}$ may be received. In an alternative embodiment, the nineteenth indicator may not be received. For example, a default value may be stored, for example, in computer-readable medium 108 and used automatically. In another alternative embodiment, the second TPR too large threshold value $T_{lT2}$ and the second FPR too large threshold value $T_lF_2$ may not be selectable. Instead, fixed, predefined values may be used. For illustration, a default value for the second TPR too large threshold value $T_{lT2}=0.05$ and the second FPR too large threshold value $T_{lF2}=0.05$ may be used.

In an operation 803, a twentieth indicator of a TPR weight value $w_{TPR}$ and an FPR weight value $w_{FPR}$ may be received. In an alternative embodiment, the twentieth indicator may not be received. For example, default values may be stored, for example, in computer-readable medium 108 and used automatically. In another alternative embodiment, the TPR weight value $w_{TPR}$ and the FPR weight value $w_{FPR}$ may not be selectable. Instead, fixed, predefined values may be used. For illustration, default values for the TPR weight value $w_{TPR}$ and the FPR weight value $w_{FPR}$ may be $w_{TPR}=0.5$ and $w_{FPR}=0.5$, respectively, though other values may be used. The TPR weight value $w_{TPR}$ and FPR weight value $w_{FPR}$ define weights for computing the bound value from bound values determined based on the TPR and based on the FPR. In an alternative embodiment, there may be a plurality of TPR weight values such that $w_{TPR}$ is an array and there may be a plurality of FPR weight values such that $w_{FPR}$ is an array.

In the alternative embodiment, model selection application 122 may perform operations 236 and 238.

In the alternative embodiment, in an operation 804, an upper bound value $B_U$, a lower bound value $B_L$, a temporary bound value $B_t$, and the bound value are initialized. For example, the bound value B is initialized to the initial bound value indicated in operation 214 using $B=b_0$, the upper bound value $B_U$ may be initialized to $B_U=-1$, the lower bound value $B_L$ may be initialized to $B_L=-1$, and the temporary bound value $B_t$ may be initialized to $B_t=-1$.

Figure 8A:
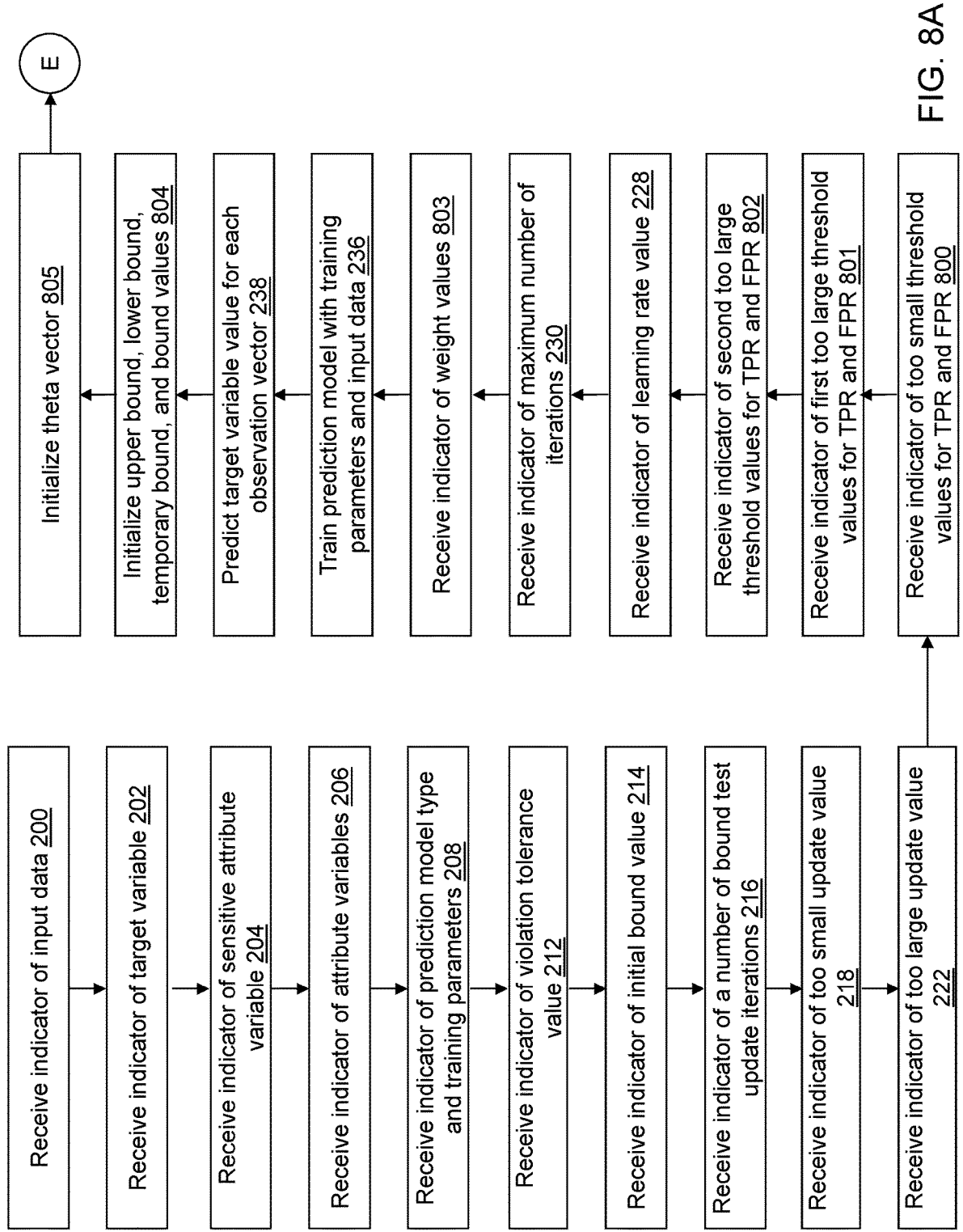
FIGS. 8A through 8E depict a flow diagram illustrating additional examples of operations performed by the model selection application of FIG. 1 using an equalized odds fairness measure type in accordance with an illustrative embodiment.
Figure 8B:
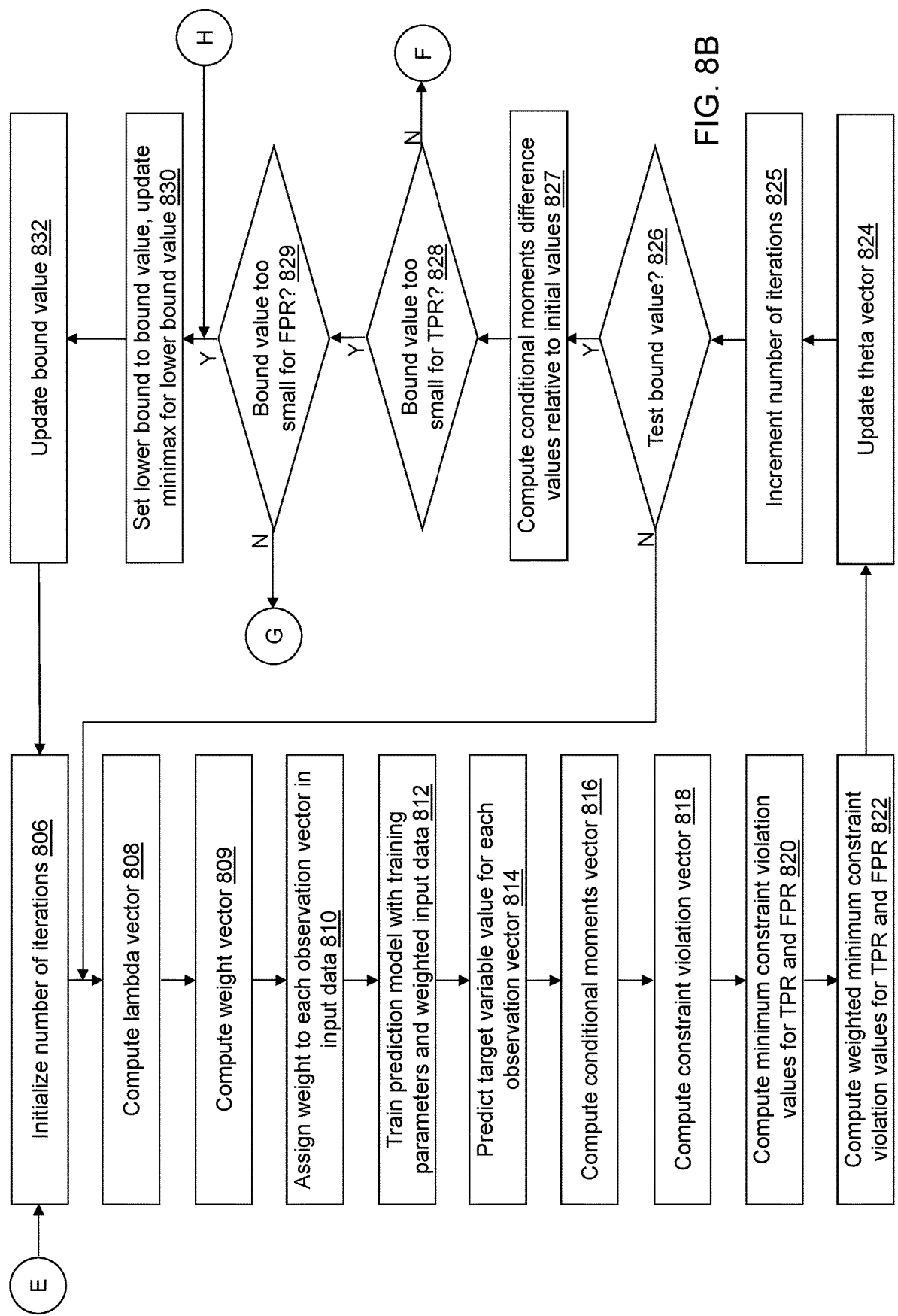

Similar to operation 244, in an operation 805, a theta vector $\theta_1$ is initialized to zeroes using $\theta_i=0, i=1, \ldots, 8$, and processing continues in operation 806 shown referring to FIG. 8B.

Similar to operation 244, in an operation 806, a number of iterations $N_I$ is initialized, for example, using $N_I=1$.

Similar to operation 246, in an operation 808, a lambda vector $\lambda$ is computed for the current iteration using $$\lambda_i = \frac{B * \exp(\theta_i)}{1 + \sum_{k=1}^{8} \exp(B * \theta_k)}, i = 1, \ldots, 8.$$

Similar to operation 248, in an operation 809, a weight vector $w_{N_I}$ is computed for the current iteration. For example, $$w_{N_I,1} = \left|1 - \frac{\lambda_{N_I,1} - \lambda_{N_I,2}}{p_{20}} + \frac{(\lambda_{N_I,1} - \lambda_{N_I,2}) - (\lambda_{N_I,3} - \lambda_{N_I,4})}{p_2}\right|,$$

$$w_{N_I,2} = \left|1 - \frac{\lambda_{N_I,3} - \lambda_{N_I,4}}{p_{21}} + \frac{(\lambda_{N_I,1} - \lambda_{N_I,2}) - (\lambda_{N_I,3} - \lambda_{N_I,4})}{p_2}\right|,$$

$$w_{N_I,3} = 1,$$

$$w_{N_I,5} = \left|1 - \frac{\lambda_{N_I,5} - \lambda_{N_I,6}}{p_{30}} + \frac{(\lambda_{N_I,5} - \lambda_{N_I,6}) - (\lambda_{N_I,7} - \lambda_{N_I,8})}{p_3}\right|,$$

$$w_{N_I,6} = \left|1 - \frac{\lambda_{N_I,7} - \lambda_{N_I,8}}{p_{31}} + \frac{(\lambda_{N_I,5} - \lambda_{N_I,6}) - (\lambda_{N_I,7} - \lambda_{N_I,8})}{p_3}\right|,$$

where $p_{20}$ indicates a percentage of the observations in input data 124 having a=0 and $y_p=1$, $p_{21}$ indicates a percentage of the observations in input data 124 having a=1 and $y_p=1$, $p_2$ indicates a percentage of the observations in input data 124 having $y_p=1$, $p_{30}$ indicates a percentage of the observations in input data 124 having a=0 and $y_p=0$, $p_{31}$ indicates a percentage of the observations in input data 124 having a=1 and $y_p=0$, and $p_3$ indicates a percentage of the observations in input data 124 having $y_p=0$.

Similar to operation 250, in an operation 810, a weight value is assigned to each observation vector in input data 124 based on a and $y_p$: when $a_i=0$ and $y_{p,i}=1$ for the $i^{th}$ observation vector, $w_i=w_{N_l,1}$; when $a_i=1$ and $y_{p,i}=1$ for the $i^{th}$ observation vector, $w_i=w_{N_l,2}$; and when $y_{p,i}=0$ for the $i^{th}$ observation vector, $w_i=w_{N_l,3}$, when $a_i=1$ and $y_{p,i}=0$ for the $i^{th}$ observation vector, $w_i=w_{N_l,5}$; and when $a_i=0$ and $y_{p,i}=0$ for the $i^{th}$ observation vector, $w_i=w_{N_l,6}$.

Similar to operation 252, in an operation 812, the prediction model is trained using each observation vector read from input data 124 with the variable value of each variable of the plurality of variables multiplied by the weight assigned to each respective observation vector in operation 810.

Similar to operation 254, in an operation 814, the prediction model trained in operation 812 is executed with each observation vector in input data 124 to define a predicted target variable value $y_{p,i}$, $i=1, \ldots, N$ for each observation vector.

Similar to operation 256, in an operation 816, a conditional moments vector N is computed for the current iteration. For example, $\mu_{0,TPR}=\text{Probability}(y=1|a=0,y_p=1)$, $\mu_{1,TPR}=\text{Probability}(y=1|a=1,y_p=1)$, and $\mu_{All,TPR}=\text{Probability}(y=1|y_p=1)$, $\mu_{0,FPR}=\text{Probability}(y=1|a=0, y_p=0)$, $\mu_{1,FPR}=\text{Probability}(y=1|a=1, y_p=0)$, and $\mu_{All,FPR}=\text{Probability}(y=1|y_p=0)$.

Similar to operation 258, in an operation 818, a constraint violation vector $\gamma=(\gamma_1, \gamma_2, \gamma_3, \gamma_4, \gamma_5, \gamma_6, \gamma_7, \gamma_8)$ is computed for the current iteration, where $\gamma_1=\mu_{0,TPR}-\mu_{All,TPR}$, $\gamma_2=-\mu_{0,TPR}+\mu_{All,TPR}$, $\gamma_3=\mu_{1,TPR}-\mu_{All,TPR}$, $\gamma_4=-\mu_{N_l,1,TPR}+\mu_{All,TPR}$, $\gamma_5=\mu_{0,FPR}-\mu_{All,FPR}$, $\gamma_6=\mu_{0,FPR}+\mu_{All,FPR}$, $\gamma_7=\mu_{1,FPR}-\mu_{All,FPR}$, and $\gamma_8=-\mu_{1,FPR}+\mu_{All,FPR}$.

In an operation 820, a minimum constraint violation value is computed for $\gamma_{min,TPR}=\min(|\gamma_1|, |\gamma_2|, |\gamma_3|, |\gamma_4|)$ and for $\gamma_{min,FPR}=\min(|\gamma_5|, |\gamma_6|, |\gamma_7|, |\gamma_8|)$, where || indicates an absolute value.

In an operation 822, a weighted minimum constraint violation value is computed for $w_{min,TPR}=w_{TPR}*\gamma_{min,TPR}$ and for $w_{min,FPR}=w_{FPR}*\gamma_{min,FPR}$.

Similar to operation 260, in an operation 824, the theta vector $\theta_I$ is updated for the next iteration using $\theta_i=\theta_i+1*\gamma$, $i=1, \ldots, 8$.

Similar to operation 262, in an operation 825, the number of iterations $N_I$ is incremented, for example, using $N_I=N_I+1$.

Similar to operation 264, in an operation 826, a determination is made concerning whether the bound value is to be tested. When the bound value is to be tested, processing continues in an operation 827. When the bound value is not to be tested, processing continues in operation 808. For example, the bound value is tested every number of iterations defined by the number of bound test update iterations indicated in operation 216. For illustration, the bound value is to be tested when $N_I>t_b$.

Similar to operation 266, in an operation 827, conditional moments difference values for TPR $\Delta\mu_{s,j,k}$ and conditional moments difference values for FPR $\Delta v_{s,j,k}$ are computed for the most recent set of iterations. For example, $$\Delta\mu_{s,j,0} = \frac{|\mu_{1,0} - \mu_{j,0}|}{|\mu_{1,0}|}, j = 2, \ldots, t_b, \Delta\mu_{s,j,1} = \frac{|\mu_{1,1} - \mu_{j,1}|}{|\mu_{1,1}|},$$

$$j = 2, \ldots, t_b, \Delta v_{s,j,0} = \frac{|v_{1,0} - v_{j,0}|}{|v_{1,0}|},$$

$$j = 2, \ldots, t_b, \text{ and } \Delta v_{s,j,1} = \frac{|v_{1,1} - v_{j,1}|}{|v_{1,1}|}, j = 2, \ldots, t_b.$$

Similar to operation 268, in an operation 828, a determination is made concerning whether the bound value B is too small for TPR. When the bound value B is too small for TPR, processing continues in an operation 829. When the bound value B is not too small for TPR, processing continues in an operation 834 shown referring to FIG. 8C. For illustration, the bound value B is too small when $\Delta v_{s,j,k}<T_{sT}$, $j=2, \ldots, t_b$, $k=0, \ldots, 0.5*N_c$ for any value of $\Delta\mu_{s,j,k}$, where $T_{sT}$ indicates the too small threshold value for TPR indicated in operation 800.

Similar to operation 268, in operation 829, a determination is made concerning whether the bound value B is too small for FPR. When the bound value B is too small for FPR, processing continues in an operation 830. When the bound value B is not too small for FPR, processing continues in an operation 860 shown referring to FIG. 8E. For illustration, the bound value B is too small when $\Delta\mu_{s,j,k}<T_{sF}$, $j=2, \ldots, t_b$, $k=0, \ldots, 0.5*N_c$ for any value of $\Delta v_{s,j,k}$, where $T_{sF}$ indicates the too small threshold value for FPR indicated in operation 800.

In operation 830, $B_L=B$, and a minimax value MMD is updated for the lower bound value $B_L$, where MMD $(B_L)=\max(\gamma_{min,TPR}, \gamma_{min,FPR})$.

In an operation 832, the bound value is updated, and processing continues in operation 806 to perform another iteration. For example, referring to FIG. 9, operations are shown to update the bound value.

In an operation 900, a determination is made concerning whether $B_U<0$ and $B_L<0$. When $B_U<0$ and $B_L<0$, processing continues in an operation 902. Otherwise, processing continues in an operation 904.

In operation 902, the bound value is reinitialized to the initial bound value using $B=b_0$, and updating of the bound value is complete.

In operation 904, a determination is made concerning whether $B_U<0$ and $B_L\geq 0$. When $B_U<0$ and $B_L\geq 0$, processing continues in an operation 906. Otherwise, processing continues in an operation 908.

In operation 906, the bound value is set using $B=B_L*d_s$, and updating of the bound value is complete, where $d_s$ is the too small update value indicted in operation 218.

In operation 908, a determination is made concerning whether $B_U\geq 0$ and $B_L<0$. When $B_U\geq 0$ and $B_L<0$, processing continues in an operation 910. Otherwise, processing continues in an operation 912.

In operation 910, the bound value is set using $B=B_U/d_l$, where $d_l$ is the too large update value indicted in operation 222, and updating of the bound value is complete.

In operation 912, the bound value is set using $B=\sqrt{B_U*B_L}$, and updating of the bound value is complete.

Figure 8C:
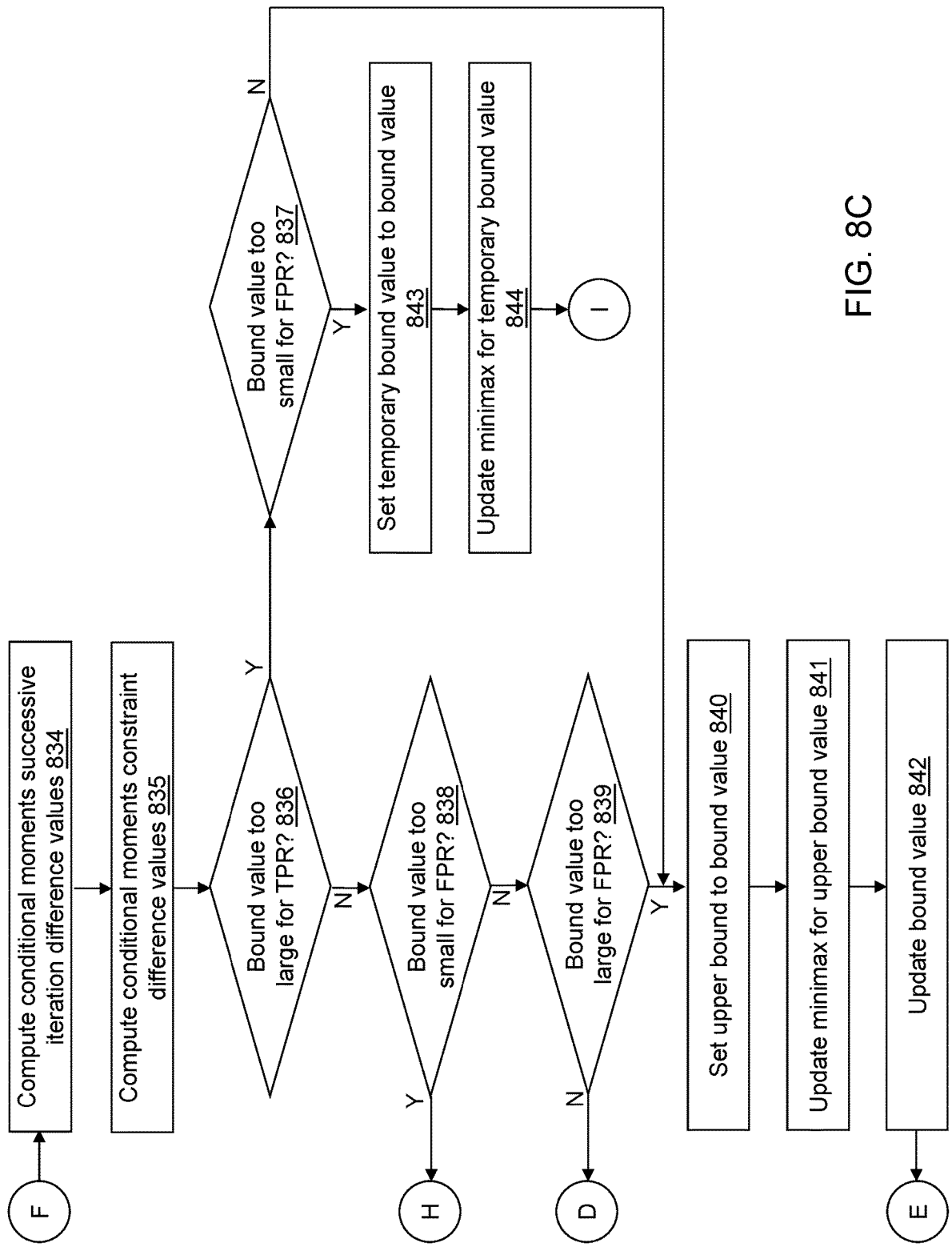

Referring to FIG. 8C, similar to operation 270, in operation 834, conditional moments successive iteration difference values for TPR $\Delta\mu_{I1,j,k}$ and conditional moments successive iteration difference values for FPR $\Delta v_{I1,j,k}$ are computed for the most recent set of iterations. For example, $\Delta\mu_{I1,j,k}=|\mu_{j,k}-\mu_{j+1,k}|$, $j=1, \ldots, t_b-1$, $k=0, \ldots, 0.5*N_c$, and $\Delta v_{I1,j,k}=|v_{j,k}-v_{j+1,k}|$, $j=1, \ldots, t_b-1$, $k=0, \ldots, 0.5*N_c$.

Similar to operation 272, in an operation 835, conditional moments constraint difference values for TPR $\Delta\mu_{I2,j}$ and conditional moments constraint difference values for FPR $\Delta v_{l2,j}$ are computed for the most recent set of iterations. For example, $\Delta \mu_{l2,j} = \mu_{j,0} - \mu_{j,1}$, $j=1, \ldots, t_b$, and $\Delta v_{l2,j} = v_{j,0} - v_{j,1}$, $j=1, \ldots, t_b$.

Similar to operation 272, in an operation 836, a determination is made concerning whether the bound value B is too large for TPR. When the bound value B is too large for TPR, processing continues in an operation 837. When the bound value B is not too large for TPR, processing continues in an operation 838. For illustration, the bound value B is too large when $\Delta \mu_{l1,1,k} \geq T_{lT1}$, $k=0, \ldots, 0.5*N_c$ or $\Delta \mu_{l1,2,k} \geq T_{lT1}$, $k=0, \ldots, 0.5*N_c$ and when $\Delta \mu_{l1,1,k} * \Delta \mu_{l1,2,k} < 0$ for $k=0, \ldots, 0.5*N_c$, where $T_{lT1}$ indicates the first too large threshold value for TPR indicated in operation 801, or when $\Delta \mu_{l2,1} < 0$ and $\Delta \mu_{l2,j} > T_{lT2}$, $j=2, \ldots, t_b$ for any value of $\Delta \mu_{l2,j}$ or when $\Delta \mu_{l2,1} > 0$ and $\Delta \mu_{l2,j} < -T_{lT2}$, $j=2, \ldots, t_b$ for any value of $\Delta \mu_{l2,j}$, where $T_{lT2}$ indicates the second too large threshold value for TPR indicated in operation 802.

Similar to operation 829, in operation 837, a determination is made concerning whether the bound value B is too small for FPR. When the bound value B is too small for FPR, processing continues in an operation 843. When the bound value B is not too small for FPR, processing continues in an operation 840.

Similar to operation 829, in operation 838, a determination is made concerning whether the bound value B is too small for FPR. When the bound value B is too small for FPR, processing continues in operation 830 shown referring to FIG. 8B. When the bound value B is not is too small for FPR, processing continues in an operation 839.

Similar to operation 836, in operation 839, a determination is made concerning whether the bound value B is too large for FPR. When the bound value B is too large for FPR, processing continues in operation 840. When the bound value B is not too large for FPR, processing continues in operation 280 shown referring to FIG. 2D. For illustration, the bound value B is too large when $\Delta v_{l1,1,k} \geq T_{lF1}$, $k=0, \ldots, 0.5*N_c$ or $\Delta v_{l1,2,k} \geq T_{lF1}$, $k=0, \ldots, 0.5*N_c$ and when $\Delta v_{l1,1,k} * \Delta v_{l1,2,k} < 0$ for $k=0, \ldots, 0.5*N_c$, where $T_{lF1}$ indicates the first too large threshold value for FPR indicated in operation 801, or when $\Delta v_{l2,1} < 0$ and $\Delta v_{l2,j} > T_{lF2}$, $j=2, \ldots, t_b$ for any value of $\Delta v_{l2,j}$ or when $\Delta v_{l2,1} > 0$ and $\Delta v_{l2,j} < -T_{lF2}$, $j=2, \ldots, t_b$ for any value of $\Delta v_{l2,j}$, where $T_{lF2}$ indicates the second too large threshold value for FPR indicated in operation 802.

In operation 840, $B_U = B$.

In an operation 841, a minimax value MMD is updated for the upper bound value $B_U$, where MMD($B_U$)=max ($\gamma_{min,TPR}, \gamma_{min,FPR}$).

Figure 9:
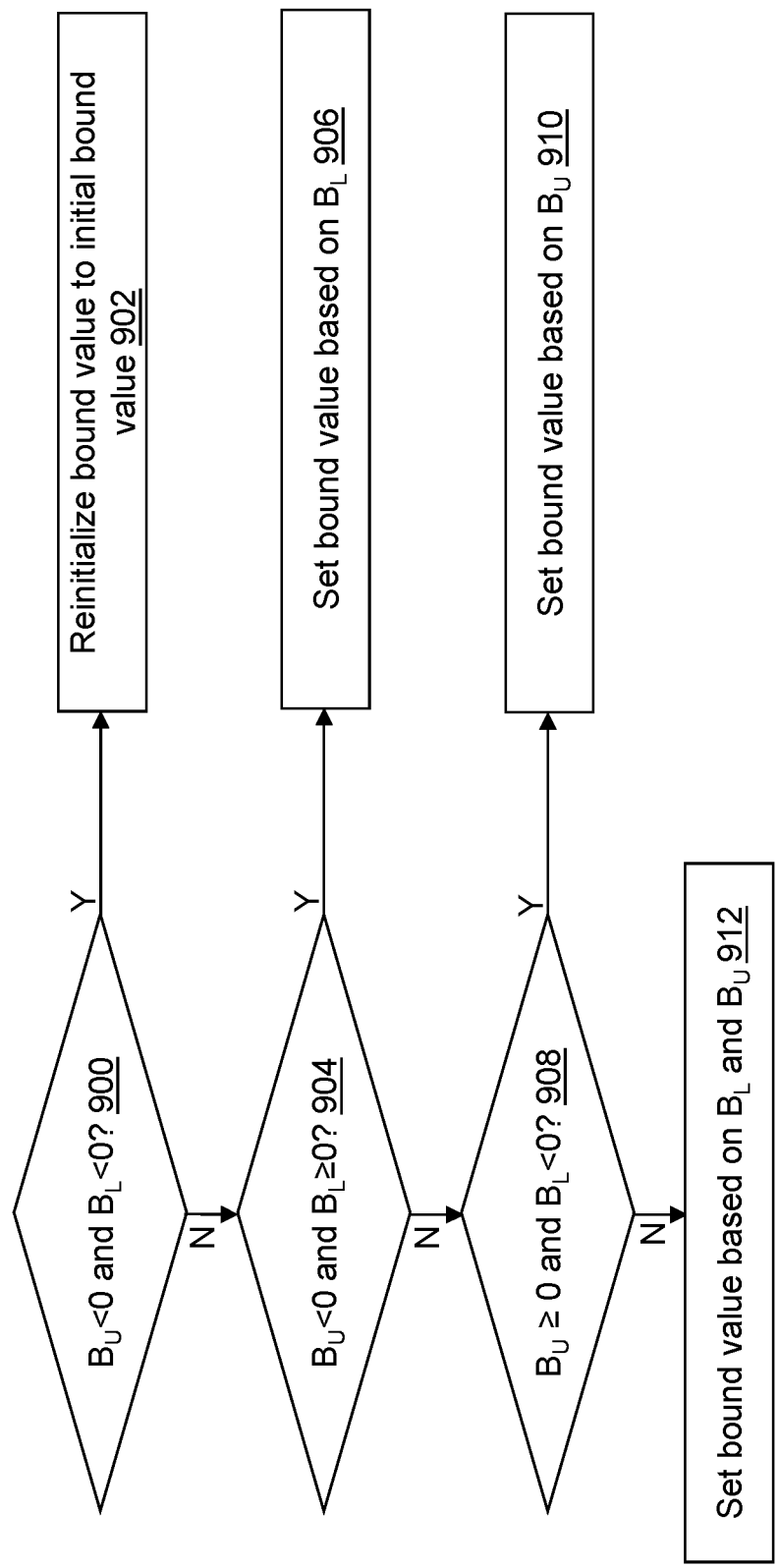
FIG. 9 depicts a flow diagram illustrating examples of operations when updating a bound value in the flow diagram of FIGS. 8A through 8E in accordance with an illustrative embodiment.

In an operation 842, the bound value is updated, for example, using the operations of FIG. 9, and processing continues in operation 806 to perform another iteration.

In operation 843, $B_t = B$.

Figure 8D:
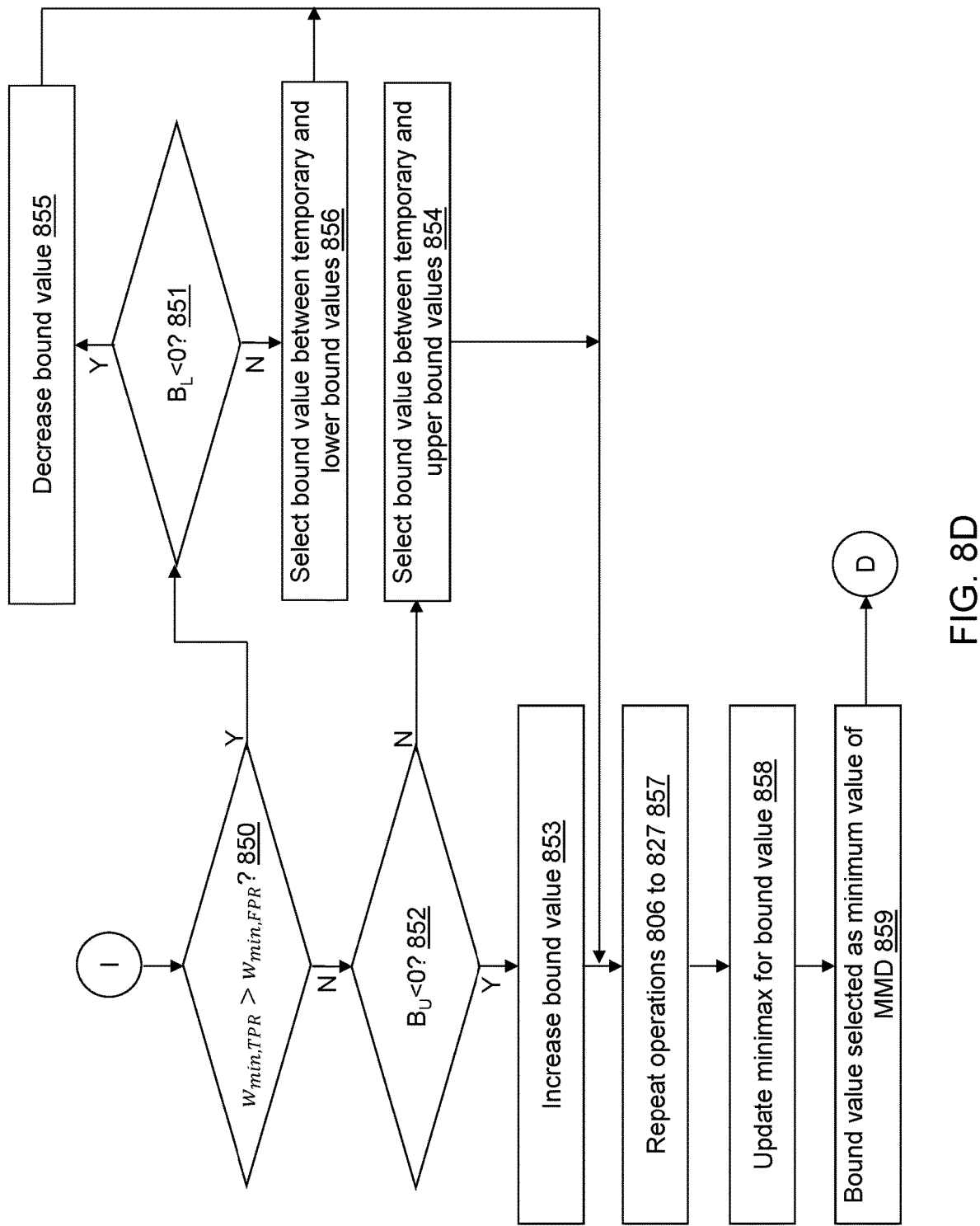

In an operation 844, the minimax value MMD is updated for the temporary bound value $B_t$, where MMD($B_t$)=max ($\gamma_{min,TPR}, \gamma_{min,FPR}$), and processing continues in an operation 850 shown referring to FIG. 8D.

In operation 850, a determination is made concerning whether $w_{min,TPR} > w_{min,FPR}$. When $w_{min,TPR} > w_{min,FPR}$, processing continues in an operation 851. When $w_{min,TPR} \leq w_{min,FPR}$, processing continues in an operation 852.

In operation 851, a determination is made concerning whether $B_L < 0$. When $B_L < 0$, processing continues in an operation 855. When $B_L \geq 0$, processing continues in an operation 856.

In operation 852, a determination is made concerning whether $B_U < 0$. When $B_U < 0$, processing continues in an operation 853. When $B_U \geq 0$, processing continues in an operation 854.

In operation 853, the bound value is increased. For illustration, the bound value is increased using $B = B * d_s$, and processing continues in an operation 857.

In operation 854, the bound value is set between the upper bound value and the temporary bound value, and processing continues in operation 857. For illustration, the bound value is set using $B = [B_t, B_U]$. For example, an arithmetic mean or a geometric mean may be computed from $B_U$ and $B_t$ and used to set a new value for the bound value B.

In operation 855, the bound value is decreased, and processing continues in operation 857. For illustration, the bound value is decreased using $B = B / d_f$.

In operation 856, the bound value is set between the temporary bound value and the lower bound value, and processing continues in operation 857. For illustration, the bound value is set using $B = [B_L, B_t]$. For example, an arithmetic mean or a geometric mean may be computed from $B_L$ and $B_t$ and used to set a new value for the bound value B.

In operation 857, operations 806 through 827 are repeated.

In an operation 858, a minimax value MMD is updated for the bound value B, where MMD(B)=max ($\gamma_{min,TPR}, \gamma_{min,FPR}$).

In operation 859, the bound value is selected as the bound value associated with a minimum value of the MMD values, and processing continues with operation 280 shown referring to FIG. 2D. For example, B is set to a minimum of the current bound value and $B_L$, $B_U$, $B_t$, or B based on which of them is associated with min (MMD($B_L$), MMD($B_U$), MMD($B_t$), MMD(B)), where MMD($B_L$) and MMD($B_U$) are only considered when the associated bound value is greater than zero.

Figure 8E:
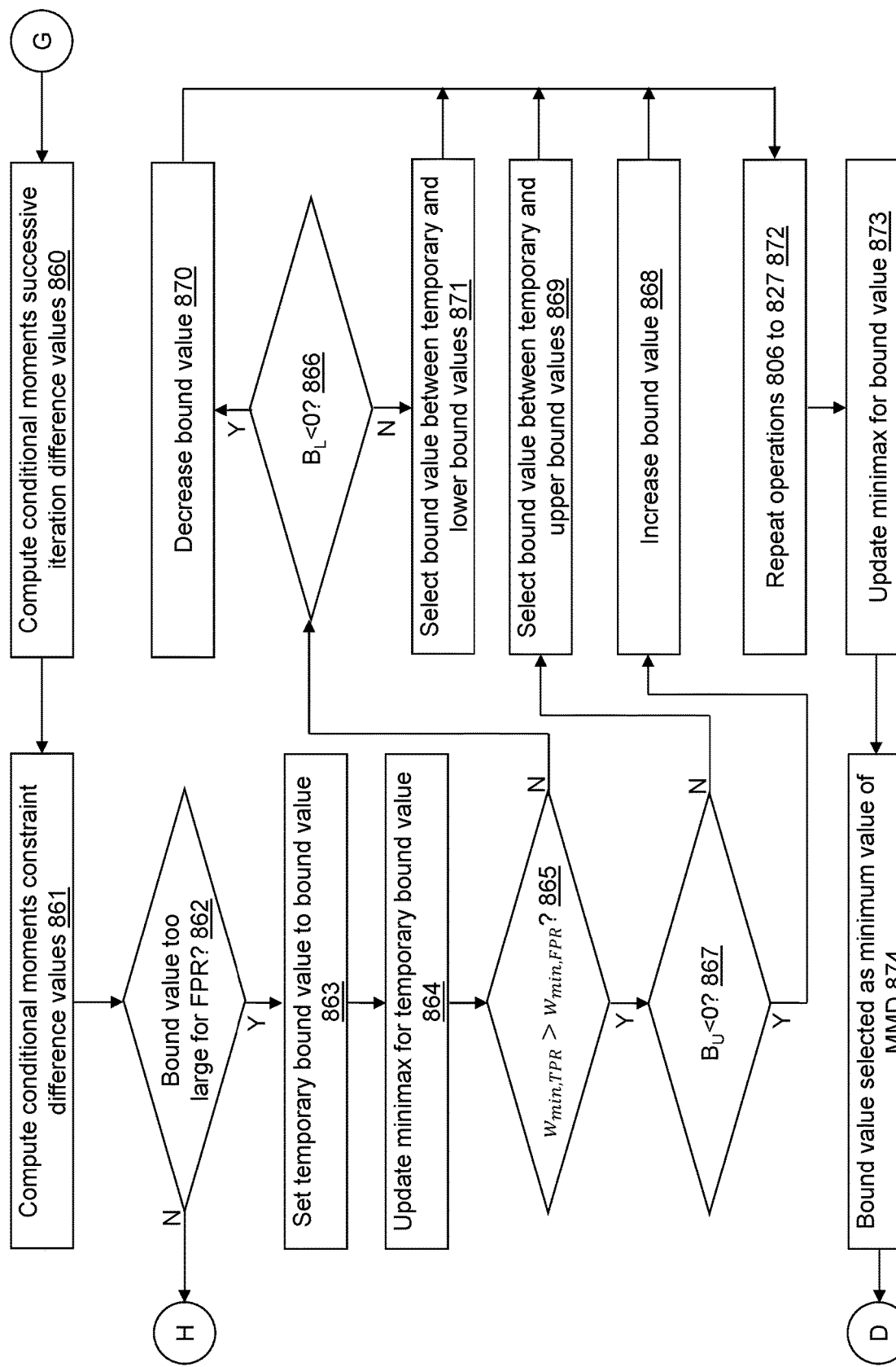

Referring to FIG. 8E, similar to operation 270, in operation 860, conditional moments successive iteration difference values for FPR $\Delta v_{l1,j,k}$ are computed for the most recent set of iterations. For example, $\Delta v_{l1,j,k} = |v_{j,k} - v_{j+1,k}|$, $j=1, \ldots, t_b-1$, $k=0, \ldots, 0.5*N_c$.

Similar to operation 272, in an operation 861, conditional moments constraint difference values for FPR $\Delta v_{l2,j}$ are computed for the most recent set of iterations. For example, $\Delta v_{l2,j} = v_{j,0} - v_{j,1}$, $j=1, \ldots, t_b$.

Similar to operation 839, in an operation 862, a determination is made concerning whether the bound value B is too large for FPR. When the bound value B is too large for FPR, processing continues in an operation 863. When the bound value B is not too large for FPR, processing continues in operation 830 shown referring to FIG. 8B.

In operation 863, $B_t = B$.

In an operation 864, the minimax value MMD is updated for the temporary bound value $B_t$, where MMD($B_t$)=max ($\gamma_{min,TPR}, \gamma_{min,FPR}$).

In operation 865, a determination is made concerning whether $w_{min,TPR} > w_{min,FPR}$. When $w_{min,TPR} > w_{min,FPR}$, processing continues in an operation 867. When $w_{min,TPR} < w_{min,FPR}$, processing continues in an operation 866.

In operation 866, a determination is made concerning whether $B_L < 0$. When $B_L < 0$, processing continues in an operation 870. When $B_L \geq 0$, processing continues in an operation 871.

In operation 867, a determination is made concerning whether $B_U < 0$. When $B_U < 0$, processing continues in an operation 868. When $B_U \geq 0$, processing continues in an operation 869.

Similar to operation 853, in operation 868, the bound value is increased, and processing continues in an operation 872.

Similar to operation 854, in operation 869, the bound value is set between the upper bound value and the temporary bound value, and processing continues in operation 872.

Similar to operation 855, in operation 870, the bound value is decreased, and processing continues in operation 872.

Similar to operation 856, in operation 871, the bound value is set between the temporary bound value and the lower bound value, and processing continues in operation 872.

In operation 872, operations 806 through 827 are repeated.

In an operation 873, a minimax value MMD is updated for the bound value B, where $MMD(B)=\max(\gamma_{min,TPR},\gamma_{min,FPR})$.

Similar to operation 857, in operation 874, the bound value is selected as the bound value associated with a minimum value of the MMD values, and processing continues with operation 280 shown referring to FIG. 2D.

Referring to FIG. 4, a block diagram of a prediction device 400 is shown in accordance with an illustrative embodiment. Prediction device 400 may include a second input interface 402, a second output interface 404, a second communication interface 406, a second non-transitory computer-readable medium 408, a second processor 410, a prediction application 422, second input data 424, prediction model 126, and predicted data 426. Fewer, different, and/or additional components may be incorporated into prediction device 400. Prediction device 400 and model selection device 100 may be the same or different devices.

Second input interface 402 provides the same or similar functionality as that described with reference to input interface 102 of model selection device 100 though referring to prediction device 400. Second output interface 404 provides the same or similar functionality as that described with reference to output interface 104 of model selection device 100 though referring to prediction device 400. Second communication interface 406 provides the same or similar functionality as that described with reference to communication interface 106 of model selection device 100 though referring to prediction device 400. Data and messages may be transferred between prediction device 400 and a distributed computing system 428 using second communication interface 406. Distributed computing system 128 and distributed computing system 428 may be the same or different computing systems.

Second computer-readable medium 408 provides the same or similar functionality as that described with reference to computer-readable medium 108 of model selection device 100 though referring to prediction device 400. Second processor 410 provides the same or similar functionality as that described with reference to processor 110 of model selection device 100 though referring to prediction device 400.

Prediction application 422 performs operations associated with generating data stored in second input data 424 using the prediction model description stored in prediction model 126. Some or all of the operations described herein may be embodied in prediction application 422. The operations may be implemented using hardware, firmware, software, or any combination of these methods.

Referring to the example embodiment of FIG. 4, prediction application 422 is implemented in software (comprised of computer-readable and/or computer-executable instructions) stored in second computer-readable medium 408 and accessible by second processor 410 for execution of the instructions that embody the operations of prediction application 422. Prediction application 422 may be written using one or more programming languages, assembly languages, scripting languages, etc. Similar to model selection application 122, prediction application 422 may be integrated with other analytic tools. Prediction application 422 and model selection application 122 may be the same or different applications that are integrated in various manners to generate fair predictions. Prediction application 422 may be implemented as a Web application.

Input data 124 and second input data 424 may be generated, stored, and accessed using the same or different mechanisms. Similar to input data 124, second input data 424 may include a plurality of rows and a plurality of columns with the plurality of rows referred to as observations or records, and the columns referred to as variables that are associated with an observation. Second input data 424 may be transposed.

Similar to input data 124, second input data 424 may be stored on second computer-readable medium 408 or on one or more computer-readable media of distributed computing system 428 and accessed by prediction device 400 using second communication interface 406. Data stored in second input data 424 may be a sensor measurement or a data communication value, for example, from a sensor 413, may be generated or captured in response to occurrence of an event or a transaction, generated by a device such as in response to an interaction by a user with the device, for example, from a second keyboard 412 or a second mouse 414, etc. The data stored in second input data 424 may include any type of content represented in any computer-readable format such as binary, alphanumeric, numeric, string, markup language, etc. The content may include textual information, numeric information, etc. that further may be encoded using various encoding techniques as understood by a person of skill in the art. The data stored in second input data 424 may be captured at different time points, periodically, intermittently, when an event occurs, etc. One or more columns may include a time value. Similar to input data 124, data stored in second input data 424 may be generated as part of the IoT, and some or all data may be pre- or post-processed by an ESPE.

Similar to input data 124, second input data 424 may be stored in various compressed formats such as a coordinate format, a compressed sparse column format, a compressed sparse row format, etc. Second input data 424 further may be stored using various structures as known to those skilled in the art including a file system, a relational database, a system of tables, a structured query language database, etc. on prediction device 400 and/or on distributed computing system 428. Prediction device 400 may coordinate access to second input data 424 that is distributed across a plurality of computing devices that make up distributed computing system 428. For example, second input data 424 may be stored in a cube distributed across a grid of computers as understood by a person of skill in the art. As another example, second input data 424 may be stored in a multi-node Hadoop® cluster. As another example, second input data 424 may be stored in a cloud of computers and accessed using cloud computing technologies, as understood by a person of skill in the art. The SAS® LASR™ Analytic Server and/or SAS® Viya™ may be used as an analytic platform to enable multiple users to concurrently access data stored in second input data 424.

Figure 5:
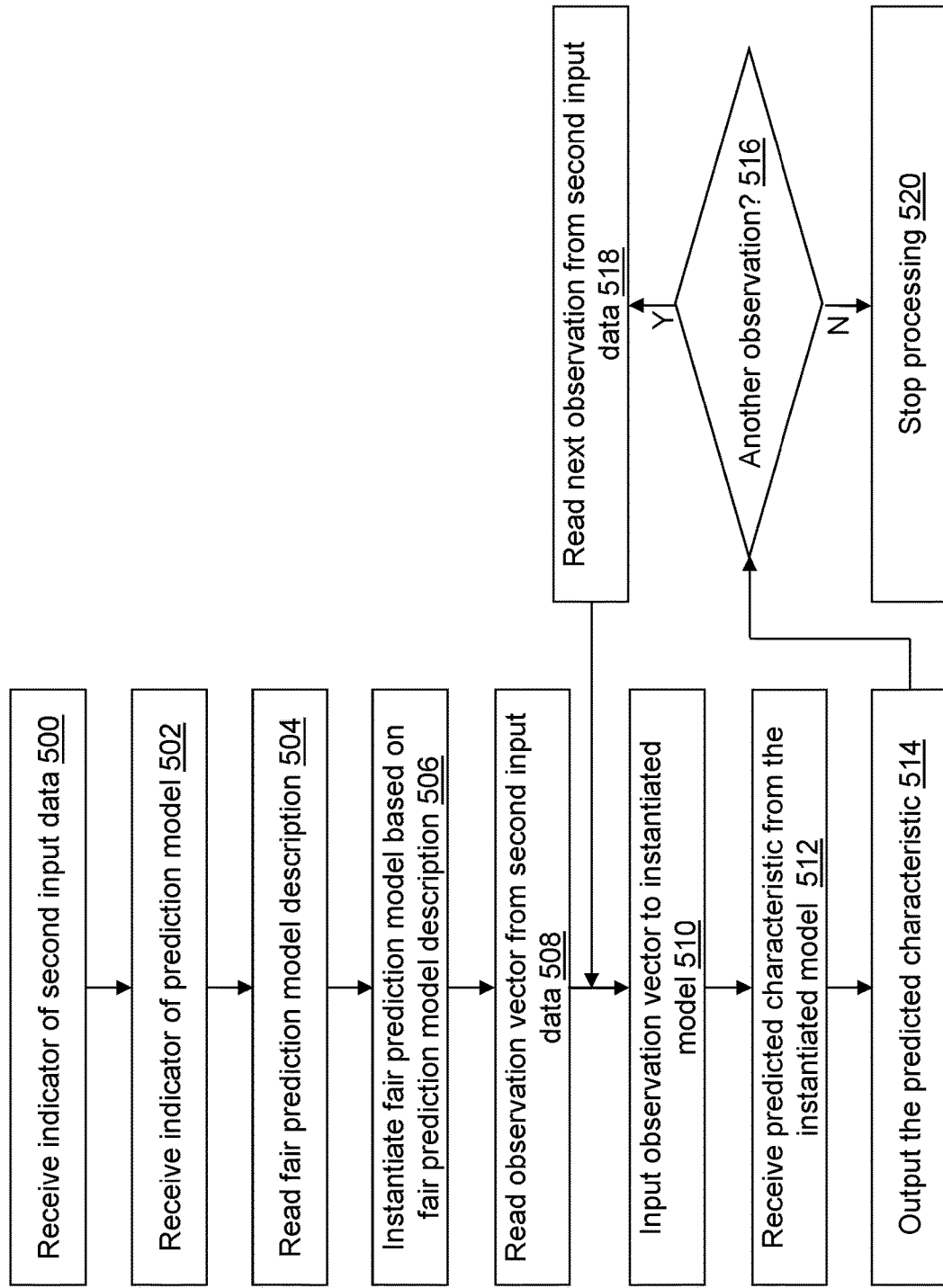
FIG. 5 depicts a flow diagram illustrating examples of operations performed by a prediction application of the prediction device of FIG. 4 in accordance with an illustrative embodiment.

Referring to FIG. 5, example operations of prediction application 422 are described to predict target variable values for observation vectors read from second input data 424. Additional, fewer, or different operations may be performed depending on the embodiment of prediction application 422. The order of presentation of the operations of FIG. 5 is not intended to be limiting. Although some of the operational flows are presented in sequence, the various operations may be performed in various repetitions, concurrently (in parallel, for example, using threads and/or distributed computing system 428), and/or in other orders than those that are illustrated.

In an operation 500, a twentieth indicator may be received that indicates second input data 426. For example, the twentieth indicator indicates a location and a name of second input data 426. As an example, the twentieth indicator may be received by prediction application 422 after selection from a user interface window or after entry by a user into a user interface window. In an alternative embodiment, second input data 426 may not be selectable. For example, a most recently created dataset may be used automatically.

In an operation 502, a twenty-first indicator may be received that indicates prediction model 126. For example, the twenty-first indicator indicates a location and a name of prediction model 126. As an example, the twenty-first indicator may be received by prediction application 422 after selection from a user interface window or after entry by a user into a user interface window. In an alternative embodiment, prediction model 126 may not be selectable. For example, a most recently created model configuration may be used automatically. As another example, prediction model 126 may be provided automatically as part of integration with model selection application 122.

In an operation 504, a fair prediction model description may be read from prediction model 126.

In an operation 506, a fair prediction model is instantiated with the fair prediction model description. For example, the parameters that describe the fair prediction model output from the selection process in operation 288 may be used to instantiate the fair prediction model.

In an operation 508, an observation vector is read from second input data 424.

In an operation 510, the observation vector is input to the instantiated fair prediction model to predict a target variable value for the observation vector.

In an operation 512, a predicted target variable value for the read observation vector is received as an output of the instantiated model.

In an operation 514, the predicted target variable value may be output, for example, by storing the predicted target variable value with the observation vector to predicted data 426. In addition, or in the alternative, the predicted target variable value may be presented on a second display 416, printed on a second printer 420, sent to another computing device using second communication interface 406, an alarm or other alert signal may be sounded through a second speaker 418, etc.

In an operation 516, a determination is made concerning whether or not second input data 424 includes another observation vector. When second input data 424 includes another observation vector, processing continues in an operation 518.

When second input data 424 does not include another observation vector, processing continues in an operation 520.

In operation 518, a next observation vector is read from second input data 424, and processing continues in operation 510.

In operation 520, processing stops and cleanup is performed as needed.

A performance of model selection application 122 was compared to the EGR method. Four datasets were used in the experiments. The first dataset was the Adult income dataset that included 48,842 observation vectors with the target variable being a prediction that an individual makes more than 50,000 per year and with gender as the sensitive attribute. The second dataset was the TransUnion dataset that included 10,459 observation vectors with the target variable being a FICO® credit score prediction and with age as the sensitive attribute. The sensitive attribute was used to determine whether the individual was 50 years of age or older or under 50 years of age. The third dataset was the German credit risk dataset that included 1,000 observation vectors with the target variable being a FICO® credit score prediction and with the citizenship status as the sensitive attribute. The sensitive attribute was used to determine whether the individual was or was not a German citizen. The fourth dataset was the HMEQ dataset that included 5,708 observation vectors with data from mortgage applicants with the target variable being a prediction whether the mortgage was approved or not and with reason as the sensitive attribute, where the reason was that the mortgage was for home improvement or for debt consolidation. The observation vectors were randomly split with 80% of the observation vectors included in a training dataset and 20% included in a test dataset.

Table 1 below shows the bound value B determined for each dataset using model selection application 122 and using a typical default value for the bound value B using the EGR method. DP was the selected fairness measure type with $l=0.01$, $d_s=5$, $d_f=2$, $T_s=0.15$, $T_{f1}=0.05$, $T_{f2}=0.04$, $c=0$, $b_0=1000$, $t_b=5$, $eps=1e-5$, and $t_{max}=10$. The prediction model type was gradient boosting. Table 1 further shows the computed DP gap and misclassification rate without fairness and with fairness applied.

TABLE 1

| Dataset | Method | Bound value B | Without Fairness | | With Fairness | |
|---|---|---|---|---|---|---|
| | | | DP gap (%) | M (%) | DP gap (%) | M (%) |
| Adult | Model selection application 122 | 125 | 13.61 | 15.03 | 0.01 | 17.16 |
| | EGR method | 100 | 13.17 | 15.37 | 1.21 | 18.5 |
| TransUnion | Model selection application 122 | 312.5 | 15.49 | 19.24 | 0.01 | 21.77 |
| | EGR method | 100 | 16.17 | 21.34 | 4.17 | 22.2 |
| German | Model selection application 122 | 8.3 | 15.66 | 8.7 | 0.91 | 13.7 |
| | EGR method | 100 | 11.6 | 6.5 | 2.42 | 20.5 |
| HEMQ | Model selection application 122 | 812.5 | 4.47 | 6.03 | 0.35 | 6.63 |
| | EGR method | 100 | 4.98 | 6.9 | 1.81 | 13.6 |

The DP gap indicates the largest absolute difference of the average predicted value between groups. Ideally, the DP gap value should be as small as possible and is always greater than zero. M indicates the misclassification rate that was used a loss function in training the prediction model. Using the bound value B determined using model selection application 122, the DP gap is reduced significantly with only a very small increase in the misclassification rate. The misclassification rate is also significantly reduced relative to using the EGR method. Based on this, model selection application 122 successfully identified a better fair prediction model than the EGR method because the misclassification rate is much lower and the DP gap is much lower as well.

Figure 6A:
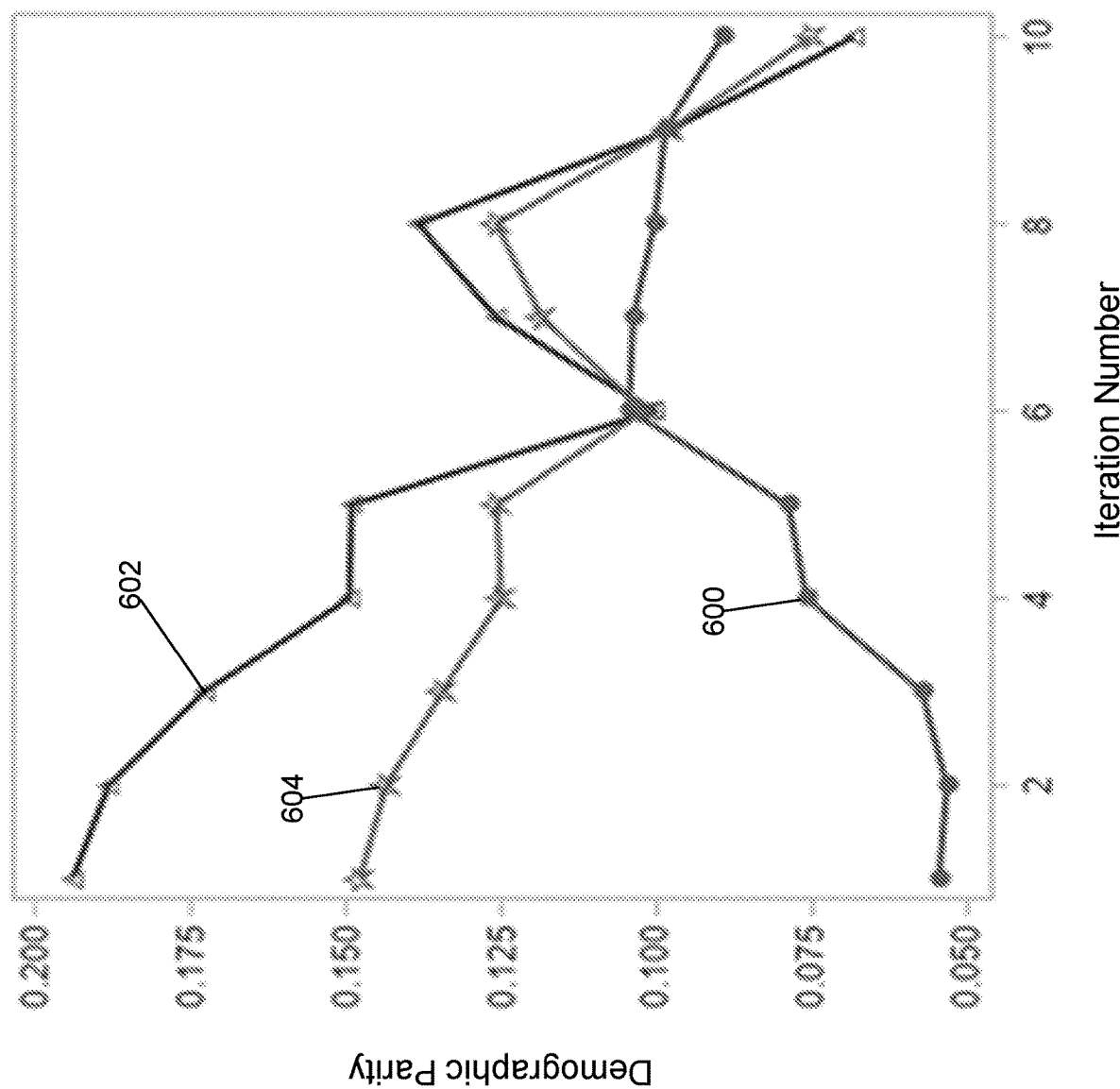
FIG. 6A shows a demographic parity fairness measure for different groups from a first dataset using the model selection application to determine a bound value in accordance with an illustrative embodiment.

Referring to FIG. 6A, a DP fairness measure as a function of an iteration number is shown for different groups using the first dataset and model selection application 122 to determine a bound value in accordance with an illustrative embodiment. A first DP curve 600 is shown for a group having A=0 that indicates female; a second DP curve 602 is shown for a group having A=1 that indicates male; and a third DP curve 604 is shown overall for both groups. The DP gap value of 0.01 was a minimum at iteration 9 that corresponded to the bound value B=125.

Figure 6B:
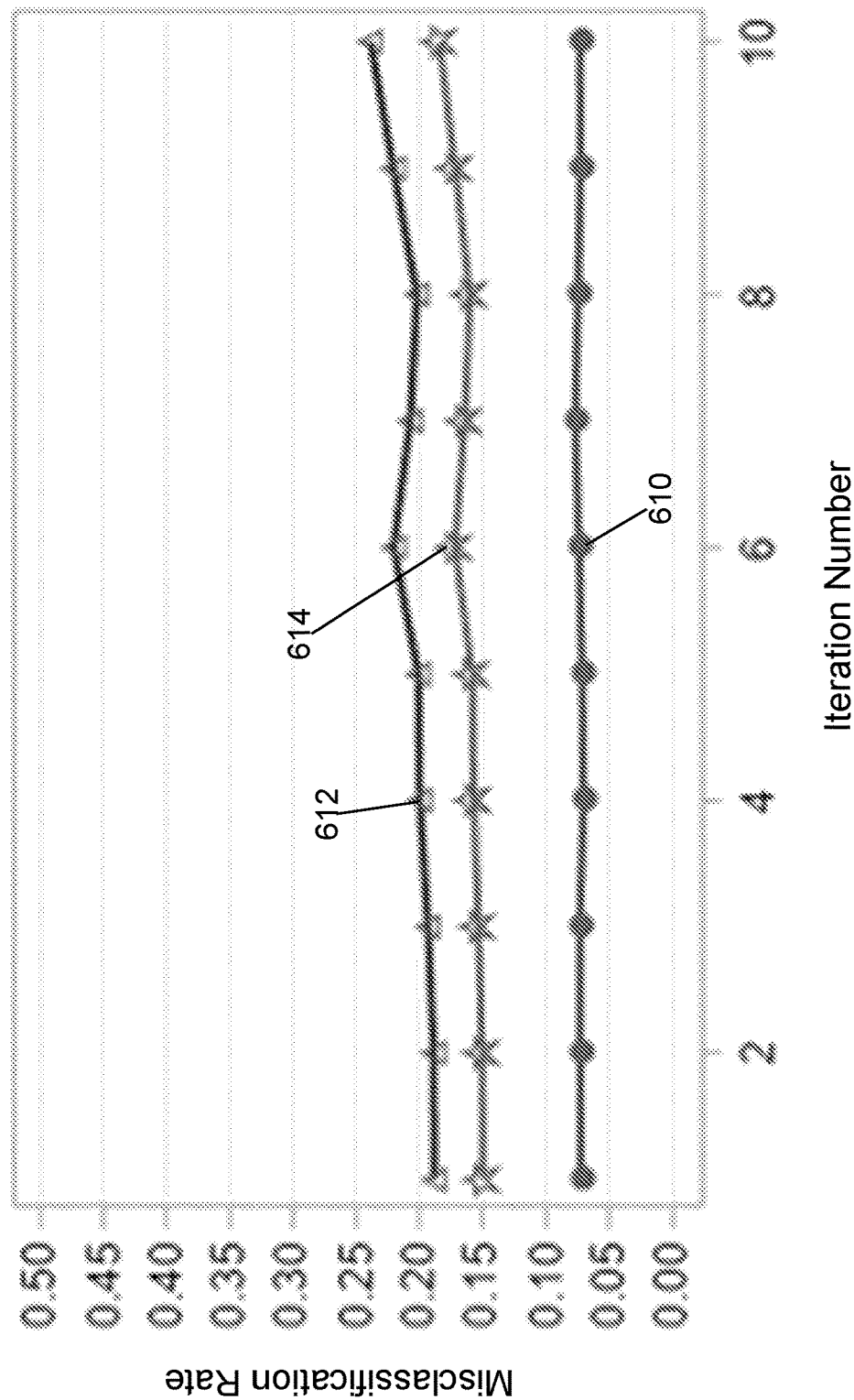
FIG. 6B shows a misclassification rate for different groups from the first dataset using the model selection application to determine the bound value in accordance with an illustrative embodiment.

Referring to FIG. 6B, a misclassification rate as a function of an iteration number is shown for different groups using the first dataset and model selection application 122 to determine a bound value in accordance with an illustrative embodiment. A first misclassification rate curve 610 is shown for a group having A=0 that indicates female; a second misclassification rate curve 612 is shown for a group having A=1 that indicates male; and a third misclassification rate curve 614 is shown overall for both groups. The overall misclassification rate value of 0.1716 at iteration 9 corresponded with the bound value B=125.

Figure 7A:
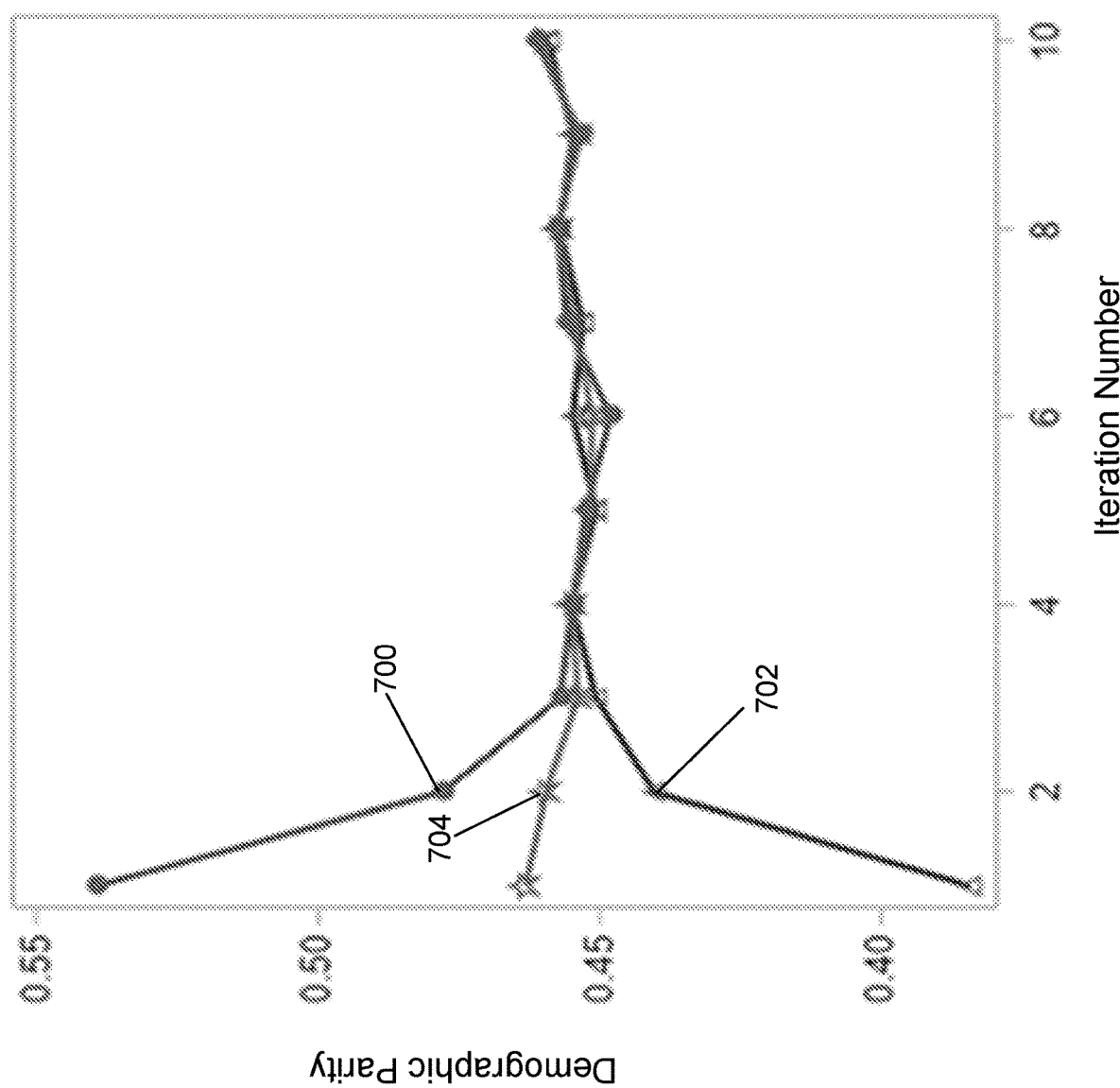
FIG. 7A shows a demographic parity fairness measure for different groups from a second dataset using the model selection application to determine a bound value in accordance with an illustrative embodiment.

Referring to FIG. 7A, a DP fairness measure as a function of an iteration number is shown for different groups using the second dataset and model selection application 122 to determine a bound value in accordance with an illustrative embodiment. A fourth DP curve 600 is shown for a group having A=0 that indicates under 50; a fifth DP curve 602 is shown for a group having A=1 that indicates greater than or equal to 50; and a sixth DP curve 604 is shown overall for both groups. The DP gap value of 0.01 was a minimum at iteration 4 that corresponded to the bound value B=312.5.

Figure 7B:
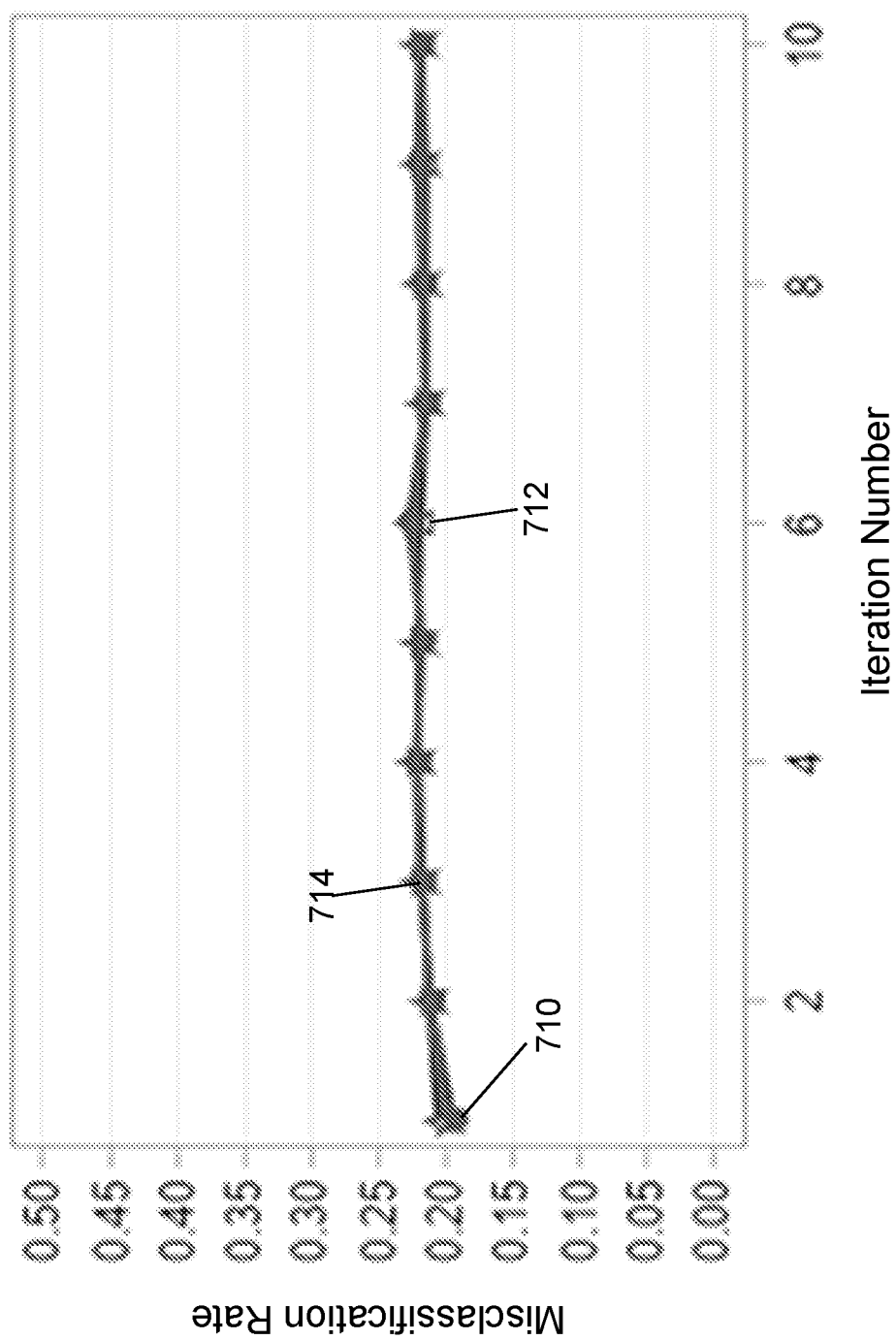
FIG. 7B shows a misclassification rate for different groups from the second dataset using the model selection application to determine the bound value in accordance with an illustrative embodiment.

Referring to FIG. 7, a misclassification rate as a function of an iteration number is shown for different groups using the second dataset and model selection application 122 to determine a bound value in accordance with an illustrative embodiment. A fourth misclassification rate curve 710 is shown for a group having A=0 that indicates under 50; a fifth misclassification rate curve 712 is shown for a group having A=1 that indicates greater than or equal to 50; and a sixth misclassification rate curve 7614 is shown overall for both groups. The overall misclassification rate value of 0.2177 at iteration 4 corresponded with the bound value B=312.5.

Table 2 below shows the test dataset performance using the prediction models trained from Table 1.

TABLE 2

| Dataset | Method | Without Fairness | | With Fairness | |
|---|---|---|---|---|---|
| | | DP gap (%) | M (%) | DP gap (%) | M (%) |
| Adult | Model selection application 122 | 14.69 | 14.57 | 0.07 | 17 |
| | EGR method | 13.18 | 15.21 | 1.94 | 17.07 |
| TransUnion | Model selection application 122 | 17.83 | 24 | 4.59 | 26.34 |
| | EGR method | 16.32 | 24.28 | 8.87 | 27.25 |
| German | Model selection application 122 | 5.92 | 25 | 3.33 | 27.5 |
| | EGR method | 3.85 | 29 | 6.74 | 30.5 |
| HEMQ | Model selection application 122 | 1.79 | 7.97 | 0.64 | 8.41 |
| | EGR method | 1.89 | 9.07 | 2.32 | 13.92 |

Using the bound value B determined using model selection application 122, the DP gap is again reduced significantly with only a very small increase in the misclassification rate. The misclassification rate is also significantly reduced relative to using the EGR method. Based on this, model selection application 122 successfully identified a better fair prediction model than the EGR method because the misclassification rate is much lower and the DP gap is much lower as well. The trained fair prediction model also generalized well.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that when executed by a computing device cause the computing device to:
   (A) train a prediction model with a plurality of observation vectors, wherein each observation vector of the plurality of observation vectors includes a target variable value, a sensitive attribute variable value, and a plurality of attribute variable values;
   (B) predict a second target variable value for each observation vector of the plurality of observation vectors using the trained prediction model;
   (C) initialize a bound value using a predefined bound value;
   (D) initialize a number of iterations;
   (E) compute a weight vector that includes a plurality of weight values using the bound value, wherein each weight value is computed based on fairness constraints defined for a predefined fairness measure type;
   (F) assign a weight value from the computed weight vector to each observation vector of the plurality of observation vectors based on the predicted second target variable value and the sensitive attribute variable value of each respective observation vector of the plurality of observation vectors;

(G) train the prediction model with each observation vector of the plurality of observation vectors weighted by the respective assigned weight value;

(H) predict the second target variable value for each observation vector of the plurality of observation vectors using the prediction model trained in (G);

(I) compute a conditional moments vector based on the fairness constraints and the second target variable value predicted in (H) and the sensitive attribute variable value of each respective observation vector of the plurality of observation vectors;

(J) increment the initialized number of iterations;

(K) repeat (E) through (J) until a predefined number of bound test update iterations is performed based on the incremented number of iterations;

(L) compute conditional moments difference values based on the fairness constraints;

(M) when the computed conditional moments difference values indicate to adjust the bound value, update the bound value and repeat (D) through (M) with the bound value replaced with the updated bound value until the computed conditional moments difference values indicate that no further adjustment of the bound value is needed;

(N) store the updated bound value as a first bound value and repeat (A) through (M);

(O) after (N), compute the updated bound value from the stored first bound value and the updated bound value determined from the repeat of (A) through (M);

(P) train a fair prediction model with the updated bound value computed in (O); and (Q) output the fair prediction model trained in (P).

2. The non-transitory computer-readable medium of claim 1, wherein training the fair prediction model comprises:

(AA) computing the weight vector using the updated bound value;

(AB) assigning the weight value from the weight vector computed in (AA) to each observation vector of the plurality of observation vectors based on the predicted second target variable value and the sensitive attribute variable value of each respective observation vector of the plurality of observation vectors;

(AC) training the prediction model with each observation vector of the plurality of observation vectors weighted by the respective weight value assigned in (AB);

(AD) predicting the second target variable value for each observation vector of the plurality of observation vectors using the prediction model trained in (AC);

(AE) computing the conditional moments vector based on the fairness constraints and the second target variable value predicted in (AD) and the sensitive attribute variable value of each respective observation vector of the plurality of observation vectors;

(AF) computing a constraint violation vector; and (AG) repeating (AA) through (AF) until training the fair prediction model is done based on the computed constraint violation vector.

3. The non-transitory computer-readable medium of claim 1, wherein, after (P), the computer-readable instructions further cause the computing device to:

read an observation vector from a dataset;
compute a third target variable value for the read observation vector using the trained fair prediction model; and
output the computed third target variable value for the read observation vector.

4. The non-transitory computer-readable medium of claim 1, wherein the predefined number of bound test update iterations is three or four.

5. The non-transitory computer-readable medium of claim 1, wherein the computed conditional moments difference values indicate to adjust the bound value when $\Delta\mu_{j,k} < T_s$, $j=2, \ldots, t_b$, $k=0, \ldots, 0.5*N_c$ for any value of $\Delta\mu_{j,k}$, where $\Delta\mu_{j,k}$ are the computed conditional moments difference values, $T_s$ indicates a predefined too small threshold value, $t_b$ is the predefined number of bound test update iterations, and $N_c$ indicates a number of constraints defined based on the predefined fairness measure type.

6. The non-transitory computer-readable medium of claim 5, wherein the conditional moments difference values are computed using $$\Delta\mu_{j,0} = \frac{|\mu_{1,0} - \mu_{j,0}|}{|\mu_{1,0}|}, j = 2, \ldots, t_b, \text{ and}$$

$$\Delta\mu_{j,1} = \frac{|\mu_{1,1} - \mu_{j,1}|}{|\mu_{1,1}|}, j = 2, \ldots, t_b,$$

where $\mu$ indicates a conditional moments vector computed based on the predefined fairness measure type, and $|\ |$ indicates an absolute value.

7. The non-transitory computer-readable medium of claim 6, wherein $\mu_{j,0}$, $j=1, \ldots, t_b$ indicates a probability of a positive prediction for a group zero sensitive attribute variable value and $\mu_{j,1}$, $j=1, \ldots, t_b$ indicates a probability of a positive prediction for a group one sensitive attribute variable value.

8. The non-transitory computer-readable medium of claim 5, wherein, when $\Delta\mu_{j,k} < T_s$, $j=2, \ldots, t_b$, $k=0, \ldots, 0.5*N_c$ for any value of $\Delta\mu_{j,k}$, the bound value is updated using $B = B * d_s$, where B indicates the bound value, and $d_s$ indicates a predefined too small update value.

9. The non-transitory computer-readable medium of claim 1, wherein the computed conditional moments difference values indicate to adjust the bound value when $\Delta\mu_{1,k} \geq T_{l1}$, $k=0, \ldots, 0.5*N_c$ or $\Delta\mu_{2,k} \geq T_{l1}$, $k=0, \ldots, 0.5*N_c$ and when $\Delta\mu_{1,k} * \Delta\mu_{2,k} < 0$ for $k=0, \ldots, 0.5*N_c$, where $\Delta\mu_{j,k}$ are conditional moments successive iteration difference values, $T_{l1}$ indicates a predefined first too large threshold value, $t_b$ is the predefined number of bound test update iterations, and $N_c$ indicates a number of constraints defined based on the predefined fairness measure type.

10. The non-transitory computer-readable medium of claim 9, wherein the conditional moments successive iteration difference values are computed using $\Delta\mu_{j,k} = |\mu_{j,k} - \mu_{j+1,k}|$, $j=1, \ldots, t_b-1$, $k=0, \ldots, 0.5*N_c$, where $\mu$ indicates a conditional moments vector computed based on the predefined fairness measure type, and $|\ |$ indicates an absolute value.

11. The non-transitory computer-readable medium of claim 10, wherein $\mu_{j,0}$, $j=1, \ldots, t_b$ indicates a probability of a positive prediction for a group zero sensitive attribute variable value and $\mu_{j,1}$, $j=1, \ldots, t_b$ indicates a probability of a positive prediction for a group one sensitive attribute variable value.

12. The non-transitory computer-readable medium of claim 9, wherein, when $\Delta\mu_{1,k} \geq T_{l1}$, $k=0, \ldots, 0.5*N_c$ or $\Delta\mu_{2,k} \geq T_{l1}$, k=0, ..., 0.5*$N_c$ and when $\Delta\mu_{1,k}*\Delta\mu_{2,k}<0$ for k=0, ..., 0.5*$N_c$, the bound value is updated using B=B/$d_l$, where B indicates the bound value, and $d_l$ indicates a predefined too large update value.

13. The non-transitory computer-readable medium of claim 9, wherein the computed conditional moments difference values further indicate to adjust the bound value when $\Delta\rho_{j,k}<T_s$, j=2, ..., $t_b$, k=0, ..., 0.5*$N_c$ for any value of $\Delta\rho_{j,k}$, where $\Delta\rho_{j,k}$ are the computed conditional moments difference values, and $T_s$ indicates a predefined too small threshold value.

14. The non-transitory computer-readable medium of claim 13, wherein the conditional moments difference values are computed using $$\Delta\rho_{j,0} = \frac{|\mu_{1,0} - \mu_{j,0}|}{|\mu_{1,0}|}, j = 2, ..., t_b, \text{ and}$$

$$\Delta\rho_{j,1} = \frac{|\mu_{1,1} - \mu_{j,1}|}{|\mu_{1,1}|}, j = 2, ..., t_b,$$

where μ indicates a conditional moments vector computed based on the predefined fairness measure type, and | | indicates an absolute value.

15. The non-transitory computer-readable medium of claim 9, wherein the computed conditional moments difference values further indicate to adjust the bound value when $\Delta\eta_1<0$ and $\Delta\eta_j>T_{l2}$, j=2, ..., $t_b$ for any value of $\Delta\eta_j$, where $\Delta\eta_j$ are conditional moments constraint difference values, and $T_{l2}$ indicates a predefined second too large threshold value.

16. The non-transitory computer-readable medium of claim 15, wherein, when $\Delta\mu_{1,k} \geq T_{l1}$, k=0, ..., 0.5*$N_c$ or $\Delta\mu_{2,k} \geq T_{l1}$, k=0, ..., 0.5*$N_c$ and when $\Delta\mu_{1,k}*\Delta\mu_{2,k}<0$ for k=0, ..., 0.5*$N_c$ or when $\Delta\eta_1<0$ and $\Delta\eta_j>T_{l2}$, j=2, ..., $t_b$ for any value of $\Delta\eta_j$, the bound value is updated using B=B/$d_l$, where B indicates the bound value, and $d_l$ indicates a predefined too large update value.

17. The non-transitory computer-readable medium of claim 15, wherein the conditional moments successive iteration difference values are computed using $\Delta\mu_{j,k}=|\mu_{j,k}-\mu_{j+1,k}|$, j=1, ..., $t_b$-1, k=0, ..., 0.5*$N_c$, where μ indicates a conditional moments vector computed based on the predefined fairness measure type, and | | indicates an absolute value.

18. The non-transitory computer-readable medium of claim 17, wherein the conditional moments constraint difference values are computed using $\Delta\eta_j=\mu_{j,0}-\mu_{j,1}$, j=1, ..., $t_b$.

19. The non-transitory computer-readable medium of claim 18, wherein $\mu_{j,0}$, j=1, ..., $t_b$ indicates a probability of a positive prediction for a group zero sensitive attribute variable value and $\mu_{j,1}$, j=1, ..., $t_b$ indicates a probability of a positive prediction for a group one sensitive attribute variable value.

20. The non-transitory computer-readable medium of claim 15, wherein the computed conditional moments difference values further indicate to adjust the bound value when $\Delta\rho_{j,k}<T_s$, j=2, ..., $t_b$, k=0, ..., 0.5*$N_c$ for any value of $\Delta\rho_{j,k}$, where $\Delta\rho_{j,k}$ are the computed conditional moments difference values, and $T_s$ indicates a predefined too small threshold value.

21. The non-transitory computer-readable medium of claim 20, wherein the conditional moments difference values are computed using $$\Delta\rho_{j,0} = \frac{|\mu_{1,0} - \mu_{j,0}|}{|\mu_{1,0}|}, j = 2, ..., t_b, \text{ and}$$

$$\Delta\rho_{j,1} = \frac{|\mu_{1,1} - \mu_{j,1}|}{|\mu_{1,1}|}, j = 2, ..., t_b,$$

where μ indicates a conditional moments vector computed based on the predefined fairness measure type, and | | indicates an absolute value.

22. The non-transitory computer-readable medium of claim 21, wherein $\mu_{j,0}$, j=1, ..., $t_b$ indicates a probability of a positive prediction for a group zero sensitive attribute variable value and $\mu_{j,1}$, j=1, ..., $t_b$ indicates a probability of a positive prediction for a group one sensitive attribute variable value.

23. The non-transitory computer-readable medium of claim 20, wherein, when $\Delta\mu_{j,k}<T_s$, j=2, ..., $t_b$, k=0, ..., 0.5*$N_c$ for any value of $\Delta\mu_{j,k}$, the bound value is updated using B=B*$d_s$, where B indicates the bound value, and $d_s$ indicates a predefined too small update value.

24. The non-transitory computer-readable medium of claim 1, wherein the computed conditional moments difference values indicate to adjust the bound value when $\Delta\mu_1<0$ and $\Delta\mu_j>T_{l2}$, j=2, ..., $t_b$ for any value of $\Delta\mu_j$, where $\Delta\mu_j$ are conditional moments constraint difference values, $T_{l2}$ indicates a predefined second too large threshold value, and $t_b$ is the predefined number of bound test update iterations.

25. The non-transitory computer-readable medium of claim 24, wherein, when $\Delta\mu_{1,k} \geq T_{l1}$, k=0, ..., 0.5*$N_c$ or $\Delta\mu_{2,k} \geq T_{l1}$, k=0, ..., 0.5*$N_c$ and when $\Delta\mu_{1,k}*\Delta\mu_{2,k}<0$ for k=0, ..., 0.5*$N_c$, the bound value is updated using B=B/$d_l$, where B indicates the bound value, and $d_l$ indicates a predefined too large update value.

26. The non-transitory computer-readable medium of claim 24, wherein the conditional moments constraint difference values are computed using $\Delta\mu_j=\mu_{j,0}-\mu_{j,1}$, j=1, ..., $t_b$, where μ indicates a conditional moments vector computed based on the predefined fairness measure type.

27. The non-transitory computer-readable medium of claim 1, wherein the first iteration of (A) through (M) computes the updated bound value for a true positive rate, and the repeat of (A) through (M) computes the updated bound value for a false positive rate.

28. The non-transitory computer-readable medium of claim 1, wherein the updated bound value is computed by weighting the first bound value and/or the updated bound value from the repeat of (A) through (M).

29. A computing device comprising:
    a processor; and
    a non-transitory computer-readable medium operably coupled to the processor, the computer-readable medium having computer-readable instructions stored thereon that, when executed by the processor, cause the computing device to
      (A) train a prediction model with a plurality of observation vectors, wherein each observation vector of the plurality of observation vectors includes a target variable value, a sensitive attribute variable value, and a plurality of attribute variable values;
      (B) predict a second target variable value for each observation vector of the plurality of observation vectors using the trained prediction model;
      (C) initialize a bound value using a predefined bound value;
      (D) initialize a number of iterations;

(E) compute a weight vector that includes a plurality of weight values using the bound value, wherein each weight value is computed based on fairness constraints defined for a predefined fairness measure type;

(F) assign a weight value from the computed weight vector to each observation vector of the plurality of observation vectors based on the predicted second target variable value and the sensitive attribute variable value of each respective observation vector of the plurality of observation vectors;

(G) train the prediction model with each observation vector of the plurality of observation vectors weighted by the respective assigned weight value;

(H) predict the second target variable value for each observation vector of the plurality of observation vectors using the prediction model trained in (G);

(I) compute a conditional moments vector based on the fairness constraints and the second target variable value predicted in (H) and the sensitive attribute variable value of each respective observation vector of the plurality of observation vectors;

(J) increment the initialized number of iterations;

(K) repeat (E) through (J) until a predefined number of bound test update iterations is performed based on the incremented number of iterations;

(L) compute conditional moments difference values based on the fairness constraints;

(M) when the computed conditional moments difference values indicate to adjust the bound value, update the bound value and repeat (D) through (M) with the bound value replaced with the updated bound value until the computed conditional moments difference values indicate that no further adjustment of the bound value is needed;

(N) store the updated bound value as a first bound value and repeat (A) through (M);

(O) after (N), compute the updated bound value from the stored first bound value and the updated bound value determined from the repeat of (A) through (M);

(P) train a fair prediction model with the updated bound value computed in (O); and (Q) output the fair prediction model trained in (P).

30. A method of training a fair machine learning model, the method comprising:

(A) training, by a computing device, a prediction model with a plurality of observation vectors, wherein each observation vector of the plurality of observation vectors includes a target variable value, a sensitive attribute variable value, and a plurality of attribute variable values;

(B) predicting, by the computing device, a second target variable value for each observation vector of the plurality of observation vectors using the trained prediction model;

(C) initializing, by the computing device, a bound value using a predefined bound value;

(D) initializing, by the computing device, a number of iterations;

(E) computing, by the computing device, a weight vector that includes a plurality of weight values using the bound value, wherein each weight value is computed based on fairness constraints defined for a predefined fairness measure type;

(F) assigning, by the computing device, a weight value from the computed weight vector to each observation vector of the plurality of observation vectors based on the predicted second target variable value and the sensitive attribute variable value of each respective observation vector of the plurality of observation vectors;

(G) training, by the computing device, the prediction model with each observation vector of the plurality of observation vectors weighted by the respective assigned weight value;

(H) predicting, by the computing device, the second target variable value for each observation vector of the plurality of observation vectors using the prediction model trained in (G);

(I) computing, by the computing device, a conditional moments vector based on the fairness constraints and the second target variable value predicted in (H) and the sensitive attribute variable value of each respective observation vector of the plurality of observation vectors;

(J) incrementing, by the computing device, the initialized number of iterations;

(K) repeating, by the computing device, (E) through (J) until a predefined number of bound test update iterations is performed based on the incremented number of iterations;

(L) computing, by the computing device, conditional moments difference values based on the fairness constraints;

(M) when the computed conditional moments difference values indicate to adjust the bound value, updating, by the computing device, the bound value and repeating, by the computing device, (D) through (M) with the bound value replaced with the updated bound value until the computed conditional moments difference values indicate that no further adjustment of the bound value is needed;

(N) storing, by the computing device, the updated bound value as a first bound value and repeating, by the computing device, (A) through (M);

(O) after (N), computing, by the computing device, the updated bound value from the stored first bound value and the updated bound value determined from the repeat of (A) through (M);

(P) training, by the computing device, a fair prediction model with the updated bound value computed in (O); and (Q) outputting, by the computing device, the fair prediction model trained in (P).

* * * * *

UNITED STATES PATENT AND TRADEMARK OFFICE
CERTIFICATE OF CORRECTION

| | | |
|---|---|---|
| PATENT NO. | : 11,531,845 B1 | Page 1 of 1 |
| APPLICATION NO. | : 17/837444 | |
| DATED | : December 20, 2022 | |
| INVENTOR(S) | : Xin Jiang Hunt et al. | |

It is certified that error appears in the above-identified patent and that said Letters Patent is hereby corrected as shown below:

In the Specification

Column 31, Line 42:
Delete the phrase "Referring to FIG. 7," and replace with --Referring to FIG. 7B,--.

In the Claims

Claim 12, Column 34, Line 67:
Delete the phrase "$_k = 0$" and replace with --$k = 0$,--.

Signed and Sealed this
Twenty-eighth Day of February, 2023

Katherine Kelly Vidal
*Director of the United States Patent and Trademark Office*